United States Patent
Iyasu et al.

(10) Patent No.: US 10,224,826 B2
(45) Date of Patent: Mar. 5, 2019

(54) CONTROL APPARATUS DETERMINING TRANSFORMER MAGNETIZATION IN A DC/DC CONVERTER BASED ON DIFFERENCE BETWEEN PRIMARY AND SECONDARY CURRENTS

(71) Applicants: SOKEN, INC., Nisshin, Aichi-pref. (JP); DENSO CORPORATION, Kariya, Aichi-pref. (JP)

(72) Inventors: Seiji Iyasu, Nisshin (JP); Yuji Hayashi, Nisshin (JP); Yuichi Handa, Kariya (JP)

(73) Assignees: SOKEN, INC., Nisshin (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 15/987,396

(22) Filed: May 23, 2018

(65) Prior Publication Data
US 2018/0342942 A1    Nov. 29, 2018

(30) Foreign Application Priority Data
May 24, 2017   (JP) .................................. 2017-102885

(51) Int. Cl.
*H02M 3/335*    (2006.01)
*H02M 1/00*    (2006.01)

(52) U.S. Cl.
CPC ............... *H02M 3/33576* (2013.01); *H02M 2001/0009* (2013.01)

(58) Field of Classification Search
CPC ......................................... H02M 3/335–3/42
See application file for complete search history.

(56) References Cited

U.S. PATENT DOCUMENTS

| | | | |
|---|---|---|---|
| 2010/0327838 A1* | 12/2010 | Melanson | H02M 3/156 323/311 |
| 2015/0380948 A1* | 12/2015 | Mazaki | H02M 7/217 307/104 |
| 2017/0324335 A1* | 11/2017 | Suetomi | H02M 3/24 |

FOREIGN PATENT DOCUMENTS

JP    2016-192889 A    11/2016

OTHER PUBLICATIONS

S. Zou, J. Lu, A. Mallik and A. Khaligh, "3.3kW CLLC converter with synchronous rectification for plug-in electric vehicles," 2017 IEEE Industry Applications Society Annual Meeting, Cincinnati, OH, 2017, pp. 1-6.*

* cited by examiner

Primary Examiner — Gary L Laxton
(74) Attorney, Agent, or Firm — Oliff PLC

(57) ABSTRACT

A control unit capable of accurately calculating a magnetization bias of a transformer is provided, thereby appropriately reducing the magnetization bias. The control unit acquires first and second currents that flow through a transformer during a period where either first or second switches individually turn ON. The control unit predicts an amount of magnetization bias in either positive side or negative side of the excitation current that flows through the transformer. The control unit reduces the magnetization bias of the transformer based on the predicted amount of magnetization bias.

11 Claims, 16 Drawing Sheets

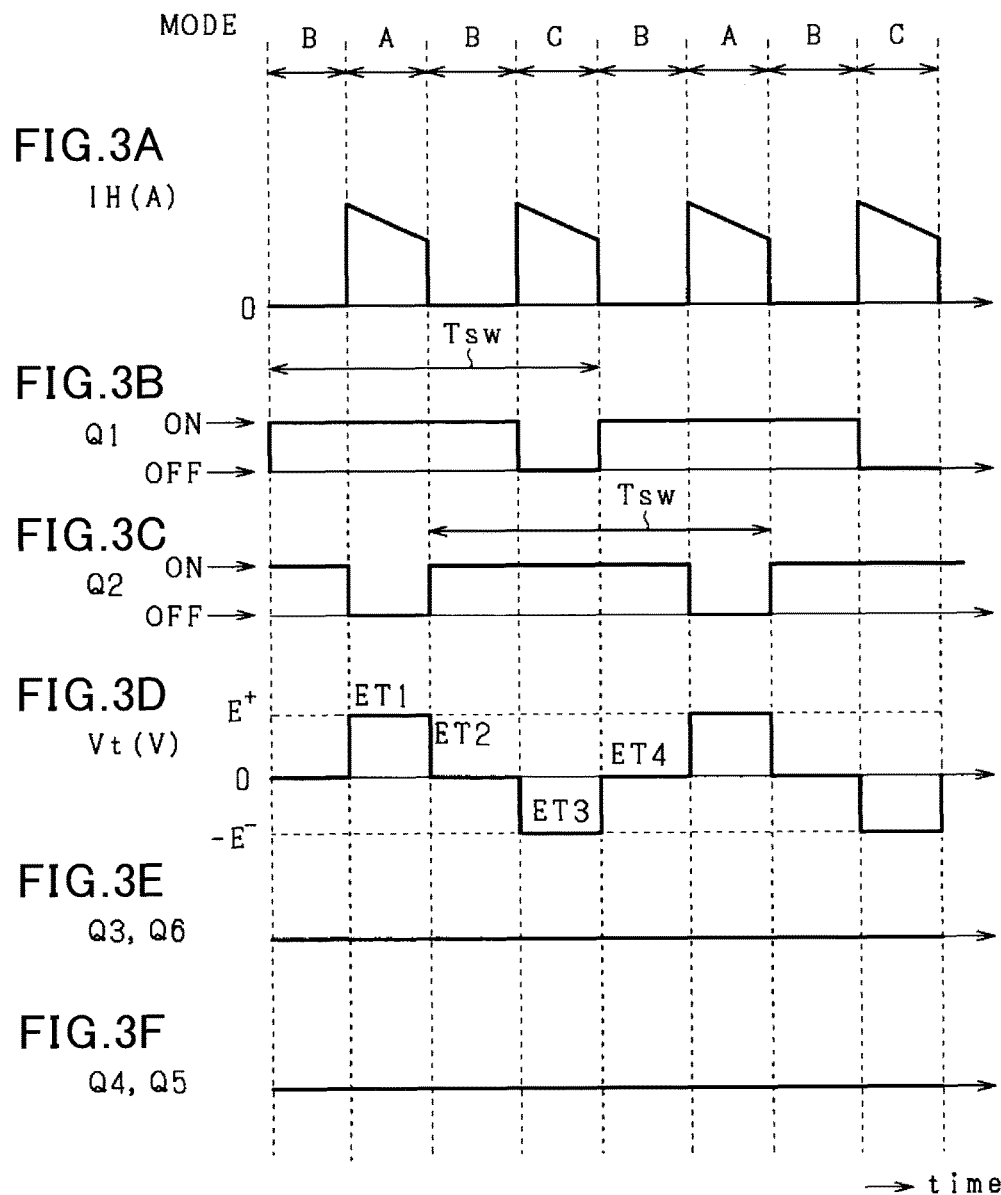

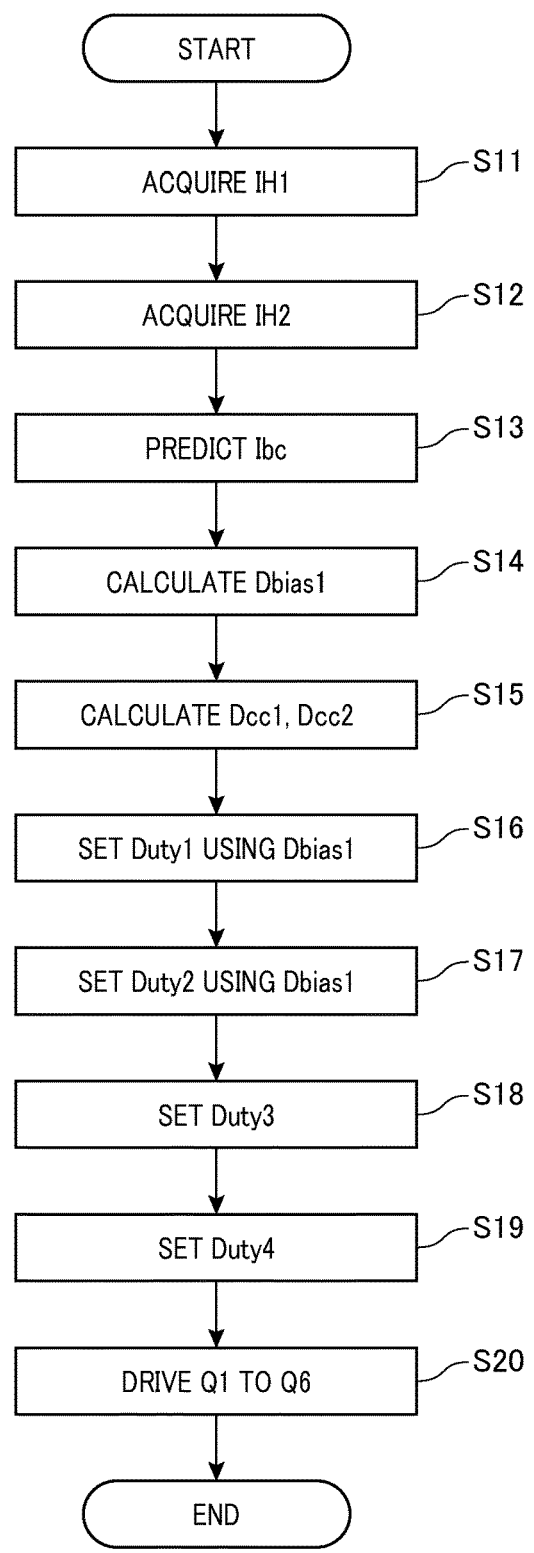

CONTROL APPARATUS DETERMINING TRANSFORMER MAGNETIZATION IN A DC/DC CONVERTER BASED ON DIFFERENCE BETWEEN PRIMARY AND SECONDARY CURRENTS

CROSS-REFERENCE TO RELATED APPLICATION

This application is based on and claims the benefit of priority from earlier Japanese Patent Application No. 2017-102885 filed May 24, 2017, the description of which is incorporated herein by reference.

BACKGROUND

Technical Field

The present disclosure relates to a control apparatus that suppresses the magnetization bias of a transformer.

Description of the Related Art

Conventionally, a power conversion apparatus in which a primary circuit and a secondary circuit are connected through a transformer is known. According to the above-mentioned power conversion apparatus, magnetization bias may occur on the transformer in which magnetic flux is biased. The magnetization bias of the transformer can be predicted using an amount of deviation in the excitation current which produces the magnetic flux in the transformer.

In this respect, Japanese Patent Application Laid-Open Publication Number 2016-192889 discloses a power conversion system in which a current detection device is provided in the secondary coil of the transformer to detect current flowing therethrough and the detected current is smoothed by a filter circuit. Then, an amount of magnetization bias representing an amount of deviation of the excitation current is predicted based on the smoothed current.

In the case where an amount of the magnetization bias is predicted by using the current detection device as disclosed in the above-described patent literature, the current detected by the current detection device may include offset errors. Hence, the offset error may lower the accuracy of the prediction of the magnetization bias. The offset error is defined as an amount of the detection value detected by the current detection device which is shifted within a specified value from an amount of the current actually flowing through the object to be detected. When the prediction accuracy of the magnetization bias is lowered, the magnetization bias of the transformer is unlikely to be corrected appropriately.

SUMMARY

The present disclosure is achieved in light of the above-described circumstances and provides a control apparatus capable of appropriately suppressing the magnetization bias by accurately predicting an amount of magnetization bias of the transformer.

The embodiment provides a control unit adapted to a power conversion apparatus including: a transformer; an inverter circuit that controls a first input switch and a second input switch to be ON and OFF to convert a direct current (DC) into an alternating current (AC), thereby allowing the alternating current to flow through a primary coil of the transformer; a rectifier circuit that converts an AC voltage of a secondary coil of the transformer into a DC voltage; and a current sensor that detects current flowing through the inverter circuit or the rectifier circuit.

The control unit includes: a first acquiring unit that acquires a detection value of the current sensor as a first current during a period in which the first input switch turns ON and the second input switch turns OFF; a second acquiring unit that acquires a detection value of the current sensor as a second current during a period in which the second input switch turns ON and the first input switch turns OFF; a prediction unit that predicts, based on a difference between the first current and the second current, a specific amount of magnetization bias that indicates a deviation in an excitation current flowing through the transformer; and a reduction unit that performs a reduction process changing a drive mode of the inverter circuit or the rectifier circuit so as to reduce the magnetization bias of the transformer, the reduction process being based on the specific amount of magnetization bias predicted by the prediction unit.

In the case where a magnetization bias has occurred on the transformer, current flowing through the rectifier circuit during a period in which each of the first input switch and the second input switch turn ON is varied because of an influence of the magnetization bias. Also, an offset error which is a DC (direct current) component superposed on the detection value of the current sensor is constant regardless of the offset error. Hence, according to the present application, the first current is acquired as the detection value of the current sensor during an ON period where the first input switch turns ON, and the second current is acquired as the detection value of the current sensor during an ON period where the second input switch turns ON. Then, an amount of the magnetization bias of the transformer is predicted based on the difference between the first current and the second current, whereby the offset error is prevented from affecting the prediction of the magnetization bias. Subsequently, in accordance with the predicted magnetization bias, a reduction process changes the drive mode of the inverter circuit or the rectifier circuit, in order to reduce the magnetization bias of the transformer. Thus, an amount of magnetization bias can be predicted accurately and the magnetization bias can be appropriately reduced.

BRIEF DESCRIPTION OF THE DRAWINGS

In the accompanying drawings:

FIGS. 3A to 3F are timing diagrams illustrating an operation sequence of a DC-DC converter (DDC);

FIG. 5 is a flowchart explaining a reduction process;

DETAILED DESCRIPTION OF THE PREFERRED EMBODIMENTS (First Embodiment)

Figure 1:
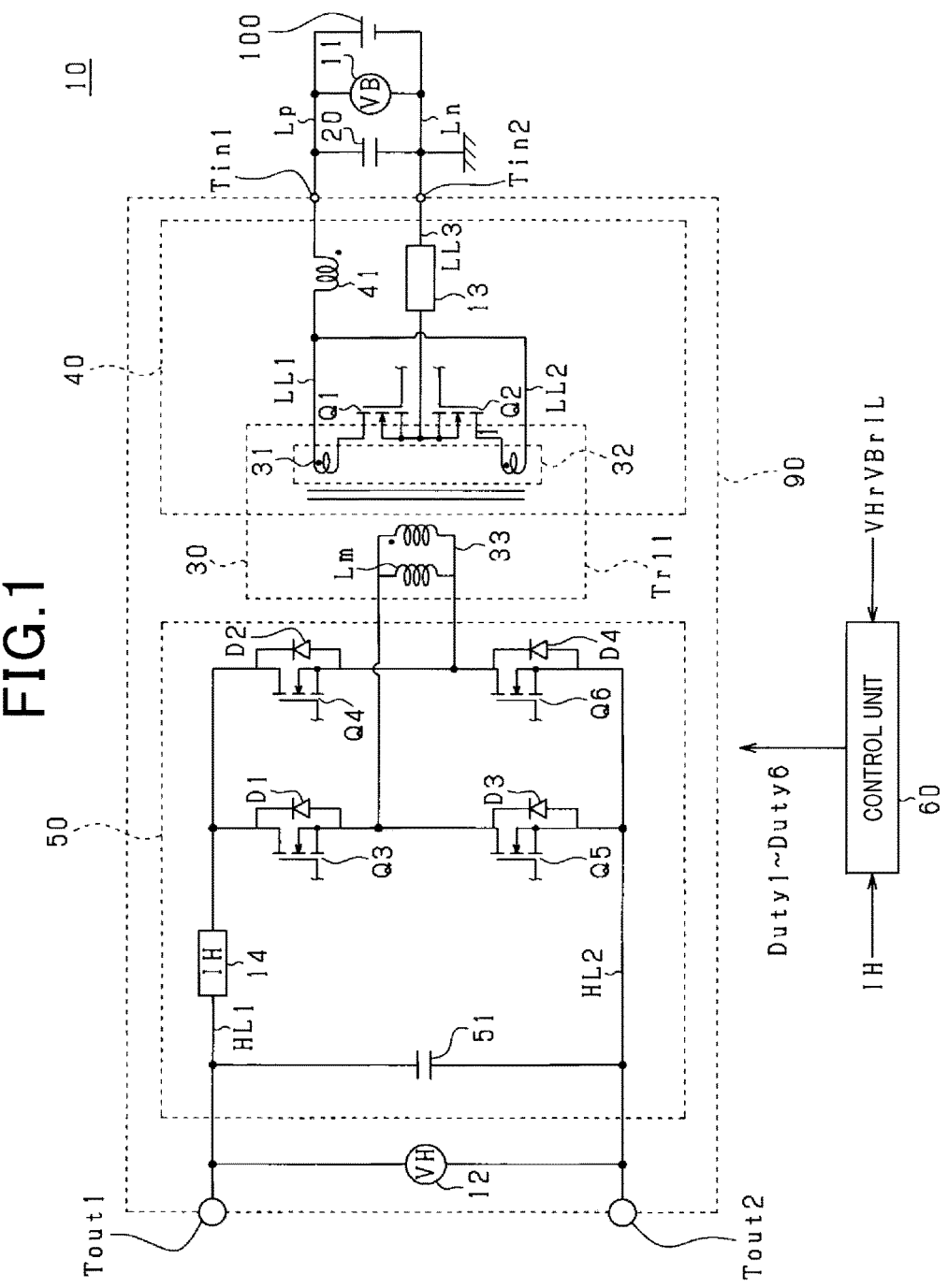
FIG. 1 is a diagram showing a configuration of a power conversion system according to a first embodiment.

FIG. 1 is a configuration of a power conversion system 10 according to a first embodiment. The power conversion system 10 boosts DC voltage supplied from a storage battery 100, and supplies power based on the boosted DC voltage to equipment as an object to be supplied with the power, which is electrically connected to a first output terminal Tout1 and a second output terminal Tout2. The equipment includes other on-board equipment, and power storage devices other than the storage battery 100, for example.

The power conversion system 10 includes a filter capacitor 20 and a DC-DC converter 90. The filter capacitor 20 is connected in parallel between the positive terminal and the negative terminal of the storage battery 100.

The DC-DC converter 90 includes a first circuit 40, a transformer 30 and a second circuit 50. The first circuit 40 is a current type converter that converts DC current to AC current (i.e., the first circuit 40 is an inverter circuit). The second circuit 50 is a voltage type converter that converts AC voltage to DC voltage (i.e., the second circuit 50 is a rectifier circuit). The first circuit 40 and the second circuit 50 are connected via the transformer 30 in which the terminal voltage VBr of the storage battery 100 is boosted in a direction from the first circuit 40 to the second circuit 50 so as to generate an output voltage VHr.

According to the present embodiment, the DC-DC converter 90 corresponds to a power conversion apparatus. Hereinafter, the DC-DC converter 90 will be referred to as DDC 90.

The transformer 30 includes a first coil 31 and a second coil 32 as a primary coil, and a third coil 33 as a secondary coil. When voltage is applied to the first and second coils 31 and 32 of the transformer 30, excitation current IM flows through the transformer 30 to produce magnetic flux. The excitation current IM causes the first to third coils 31 to 33 to produce interlinkage flux, thereby causing the third coil 33 to produce secondary winding voltage Vt. A relationship between the excitation current IM and the secondary winding voltage Vt is expressed in the following equation (1).

$$Vt = Lm \times (\Delta IM/\Delta t) \quad (1)$$

Lm represents excitation inductance Lm. In FIG. 1, excitation inductance Lm is connected in parallel to the third coil 33. $\Delta IM/\Delta t$ represents a change in the excitation current IM with respect to time.

A first circuit 40 is connected to the first and second coils 31 and 32 of the transformer 30. The first circuit 40 includes first and second low voltage wirings LL1, LL2, a reactor 41, a first switch Q1 and a second switch Q2.

The first low voltage wiring LL1 is connected to the first end of the first coil 31, and the second low voltage wiring LL2 is connected to the first end of the second coil 32. A first input terminal Tin1 is connected to an opposite side of the first coil 31 side to which the first low voltage wiring LL1 is connected. The first input terminal Tin1 is connected to the positive terminal of the storage battery 100. Moreover, the first low voltage wiring LL1 is connected to an opposite side of the second coil 32 side to which the second low voltage wiring LL2 is connected. The reactor 41 is connected in series to a side closer to the first input terminal Tin1 side than to a connection point between the first low voltage wiring LL1 and the second low voltage wiring LL2.

A center tap circuit is configured of first and second switches Q1 and Q2, the first coil 31 and the second coil 32. The drain of the first switch Q1 is connected to the second end of the coil 31, and the drain of the second switch Q2 is connected to the second end of the second coil 32. The source of the first switch Q1 and the source of the second switch Q2 are connected to a third low voltage wiring LL3. The third low voltage wiring LL3 is connected to the second input terminal Tint which is connected to the negative terminal of the storage battery 100. According to the present embodiment, the first and second switches Q1 and Q2 are configured of MOS-FET (metal oxide semiconductor field effect transistor). The first switch Q1 corresponds to a first input switch and the second switch Q2 corresponds to a second input switch.

When the first switch Q1 turns ON, a closed circuit is formed including the storage battery 100, the reactor 41 and the first coil 31. When the second switch Q2 turns ON, a closed circuit is formed including the storage battery 100, the reactor 41 and the second coil 32.

The second circuit 50 is connected to the third coil 33 of the transformer 30. The second circuit 50 includes a third switch Q3, a fourth switch Q5 and a fifth switch Q5, a sixth switch Q6 and a first high voltage wiring HL1, a second high voltage wiring HL2 and a smoothing capacitor 51.

The third to sixth switches Q3 to Q6 constitute a full bridge circuit. The source of the third switch Q3 and the drain of the fifth switch Q5 are serially connected to form a first leg. The source of the fourth switch Q4 and the drain of the sixth switch Q6 are serially connected to form a second leg. The first leg and the second leg are connected in parallel between the first and second high voltage wirings HL1 and HL2. The connection point between the third switch Q3 and the fifth switch Q5 is connected to the first end of the third coil 33, and the connection point between the fourth switch Q4 and the sixth switch Q6 is connected to the second end of the third coil 33.

According to the present embodiment, the third to sixth switches Q3 to Q6 are configured of MOSFETs. Further, reflux diodes D1 to D4 are connected between the drain and the source of respective third to sixth switches Q3 to Q6. The third and sixth switches Q3 and Q6 correspond to the first output side switch and the fourth and fifth switches Q4 and Q5 correspond to the second output side switch.

The first high voltage wiring HL1 is connected to the first output terminal Tout1 in a side opposite to a side where the third and fourth switches Q3 and Q4 are connected. Also, the second high voltage wiring HH1 is connected to the second output terminal Tout2 in a side opposite to a side where the fifth and sixth switches are connected. The smoothing capacitor 51 is connected in parallel to the first high voltage wiring HL1 and the second high voltage wiring HL2 to be closer to an output side than the third to sixth switches Q3 to Q6.

The power conversion system 10 is provided with the control unit 60. The control unit 60 is configured of known microcomputer and controls the switches Q1 to Q6 included in the first circuit 40 and the second circuit 60 to be ON and OFF. The control unit 60 may be configured of an integrated circuit including a plurality of functional blocks, for example. Functions of the control unit 60 will be described later.

The power conversion system 10 includes an input voltage sensor 11, an output voltage sensor 12, a first current sensor 13 and a second current sensor 14. The input voltage sensor 11 is connected between a positive side wiring Lp and a negative side wiring Ln to detect terminal voltage VBr of the storage battery 100, where the positive side wiring Lp connects the first input terminal Tin1 and the positive terminal of the storage battery 100, and the negative side wiring Ln connects the second input terminal Tint and the negative terminal of the storage battery 100. The output voltage sensor 12 is connected in parallel between the first output terminal Tout1 and the second output terminal Tout2, and detects the terminal voltage of the smoothing capacitor 51 as the output voltage VHr.

The first current sensor 13 detects current that flows through the first switch Q1 and the second switch Q2 as the primary side current IL. According to the present embodiment, the first current sensor 13 is provided in the first circuit 40. Specifically first current sensor 13 is disposed at the third low voltage wiring LL3 that connects respective source terminals of the first switch Q1 and the second switch Q2 and the second input terminal Tint. The second current sensor 14 detects current flowing through the third to sixth switches Q3 to Q6 as the secondary side current IH. According to the present embodiment, the second current sensor 14 is provided in the second circuit 50. Specifically, the second current sensor 14 is disposed at the first high voltage wiring HL1 which is in the first output terminal Tout1 side than the full bridge circuit configured of the third to sixth switches Q3 to Q6 is. The detection values VBr, VHr, IL and IH corresponding to the input voltage sensor 11, the output voltage sensor 12, the first current sensor 13 and the second current sensor 14 are inputted to the control unit 60.

Figure 2:
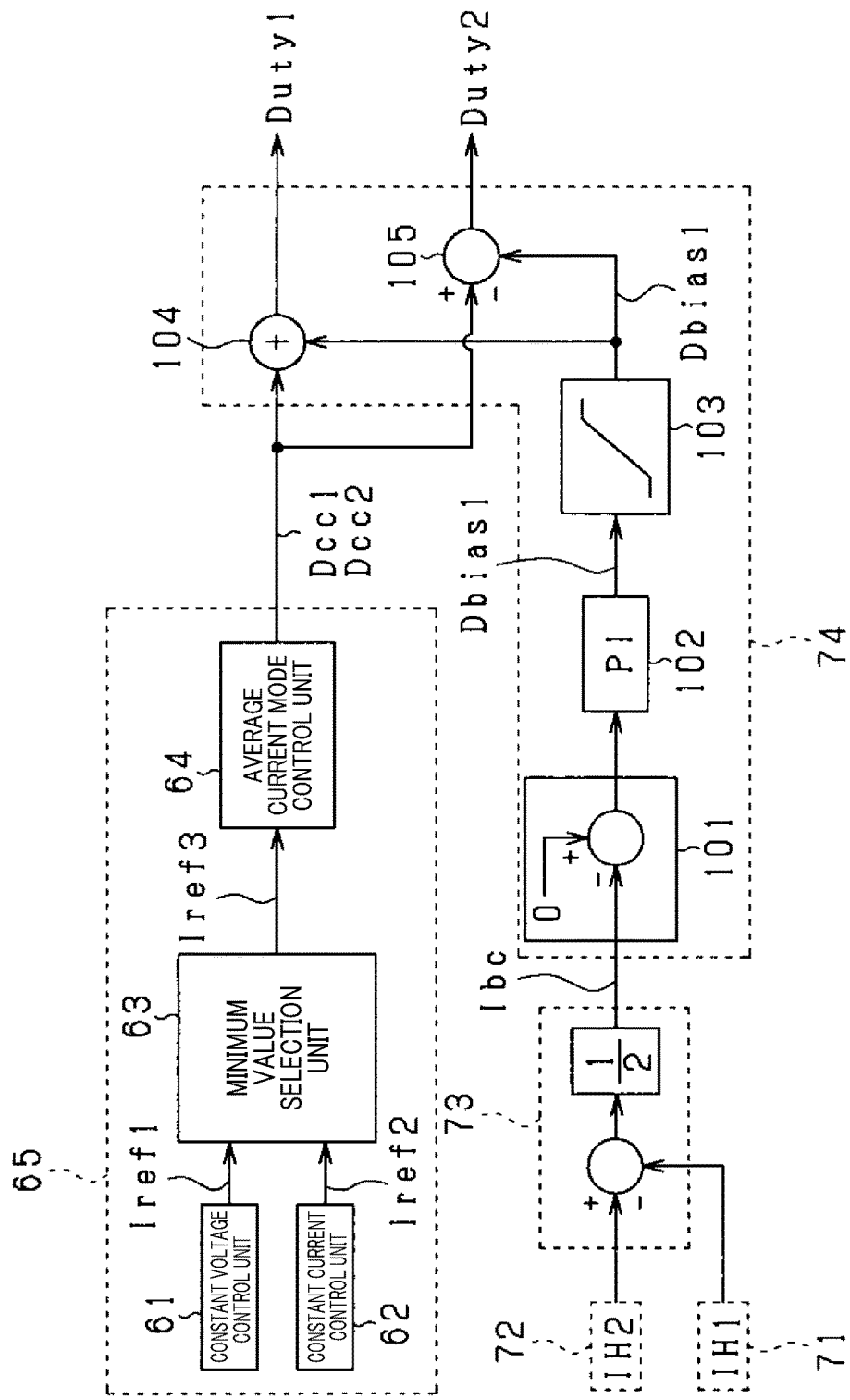
FIG. 2 is a block diagram showing function of the control apparatus.

Next, function of the control unit 60 will be described. FIG. 2 is a block diagram illustrating function of the control unit 60. The control unit 60 includes a primary side setting unit 65 which sets the ON period of the first and second switches Q1 and Q2.

As shown in FIG. 2, the primary side setting unit 65 mainly includes a constant voltage control unit 61, a constant current control unit 62, a minimum value selection unit 63 and an average current mode control unit 64.

The constant voltage control unit 61 performs a constant voltage control in which a feedback control is applied such that the output voltage VHr becomes an output voltage command value VH*. According to the present embodiment, the constant voltage control unit 61 calculates a target current value Iref1 which is a target value of the output current of the DDC 90 as a control input in the feedback control where the output voltage VHr is controlled to be the output voltage command value VH*.

The constant current control unit 62 calculates an upper limit current Iref2. The upper limit current Iref2 is set based on the rated current of the DDC 90. For example, the upper limit current Iref2 is set based on the turn ratio of the transformer 30, ripple current flowing through the reactor 41.

The minimum value selecting unit 63 compares the target current value Iref1 outputted by the constant voltage control unit 61 and the upper limit current Iref2 outputted by the constant current control unit 62, determines smaller one value in the comparison, and outputs the smaller value as the command current value Iref3.

The average current mode control unit 64 sets the ON periods of the first and second switches Q1 and Q2 using the average current mode control in order to control the secondary side current IH to be the command current value Iref3. For example, the average current mode control unit 64 calculates a deviation between the target current value Iref3 and the secondary current IH, and calculates a first drive command value Dcc1 and second drive command value Dcc2 which determine the ON periods of the first and second switches Q1 and Q2 so as to control the deviation to be 0. The first drive command value Dcc1 determines ON period in the first switching period Tsw of the first switch Q1. The second drive command value Dcc2 determines ON period in the first switching period Tsw of the second switch Q2. According to the present embodiment, the phase of the first drive command value Dcc1 is shifted for a half period (i.e., Tsw/2) from that of the second drive command value Dcc2.

The control unit 60 performs a reduction process that reduces magnetization bias of the transformer 30. The control unit 60 is provided with a first acquiring unit 71, a second acquiring unit 72, a prediction unit 73 and a reduction unit 74. Respective units 71 to 74 will be described later.

Next, operations of the DDC 90 will be described. FIGS. 3A to 3F are timing diagram illustrating an operation sequence of the DDC 90.

FIG. 3A illustrates a change in the secondary side current IH. FIG. 3B illustrates a change in a drive state of the first switch Q1, and FIG. 3C illustrates a change in a drive state of the second switch Q2. FIG. 3C illustrates a change in a drive state of the second switch Q2. FIG. 3D illustrates a change in the secondary winding voltage Vt. FIG. 3D indicates the maximum value of the secondary winding voltage Vt as the maximum value E+ and the minimum value thereof as the minimum value E−. FIG. 3E illustrates a change in the drive state of the third and sixth switches Q3 and Q6. FIG. 3F illustrates a change in the fourth and fifth switches Q4 and Q5.

The DDC 90 changes its operation mode in the order of A mode, B mode, C mode, and B mode. In the B mode, both of the first and second switches Q1 and Q2 turn ON, whereby the secondary winding voltage Vt is not produced on the third coil 33 of the transformer 30. In the A mode, only the first switch Q1 independently turns ON, thereby producing positive secondary winding voltage Vt on the third coil 33. In the C mode, only the secondary switch Q2 independently turns ON, thereby producing negative secondary winding voltage Vt on the third coil 33. Note that the third to sixth switches Q3 to Q6 turn OFF in the A, B and C modes.

According to the present embodiment, one switching period of the first switch Q1 and one switching period of the second switch Q2 have the same period Tsw. Also, the start timing of the ON period of the first switch Q1 and the start timing of the ON period of the second switch Q2 are shifted from each other by a half period of one switching period Tsw.

In the B mode, the first and second switches Q1 and Q2 are ON together so that a closed circuit is formed including the first coil 31 and the second coil 32. Hence, potential difference no longer appears between the first and second coils 31 and 32. Accordingly, the secondary winding voltage Vt is not produced in the third coil 33 so that the secondary side current IH does not flow through the second circuit 50. Also, in the B mode, current flowing through the reactor 41 increases, thereby charging magnetic energy in the reactor 41.

When the operational mode changes to the A mode from the B mode, the operational state changes from a state where the first and the second switches Q1 and Q2 turn ON to a state where the only the first switch Q1 turns ON. Current flows through the closed circuit including the first coil 31 and voltage is applied to the first coil 31. Also, current charged in the reactor 41 flows through the first coil 31, whereby the voltage applied to the first coil 31 becomes sum of the terminal voltage VBr and voltage generated in the reactor 41. Therefore, the secondary winding voltage Vt is produced on the third coil 33 and the secondary side current IH flows through the second circuit 50. In the A mode, positive secondary winding voltage Vt is produced on the third coil 33.

Since the operational mode changes to the B mode from the A mode, the first and second switches Q1 and Q2 turn ON together so that voltage difference between the first coil 31 and the second coil 32 disappears. Accordingly, the secondary winding voltage Vt is not produced, and the secondary side current IH does not flow in the second circuit 50. Moreover, magnetic energy is charged in the reactor 41.

When the operational state is changed from the B mode to the C mode, the operational state is changed from a state where the first and second switches Q1 and Q2 are ON to a state where only the second switch Q2 is independently ON. Hence, current flows in the closed circuit including the second coil 32. Also, in the C mode, voltage applied to the second coil 32 is sum of the terminal voltage VBr and the reactor 41. Therefore, the second winding voltage Vt is produced on the third coil 33 and the secondary side current IH flows in the second circuit 50. Also, in this C mode, the voltage applied to the second coil 32 is sum of the terminal voltage VBr and voltage of the reactor 41. Therefore, the secondary winding voltage Vt is produced on the third coil 33 and the secondary side current IH flows in the second circuit 50. In the C mode, since the direction of the voltage applied to the second coil 32 is opposite to the direction of the voltage applied to the first coil 31 in the A mode, negative winding voltage Vt is produced on the third coil 33.

During the operation of the DDC 90 shown in FIG. 3, the ON period of the first and second switches Q1 and Q2 is determined such that the magnetic flux of the transformer 30 is not saturated. Specifically, the ON periods of the first and second switches Q1 and Q2 are determined such that in-out balance of the ET product of the transformer 30 in one switching period Tsw of the first and second switches Q1 and Q2 is expressed in the following equation (2). The ET product represents a voltage-time product of the voltage transmitted from the primary side to the secondary side of the transformer 30. According to the present embodiment, the ET product is calculated using the product of the secondary winding voltage Vt and the time during which the secondary winding voltage Vt is applied.

$$\Sigma ET = ET1 + ET2 + ET3 + ET4 = 0 \quad (2)$$

ET1 represents a product of the secondary winding voltage Vt and the ON period during which the first switch Q1 is independently ON in the A mode. ET3 represents a product of the secondary winding voltage Vt and the ON period during which the secondary switch Q2 is independently ON in the C mode. Note that ET2 and ET4 represent ET product in the B mode which are 0 since the secondary winding voltage Vt is theoretically 0.

Figure 4A:
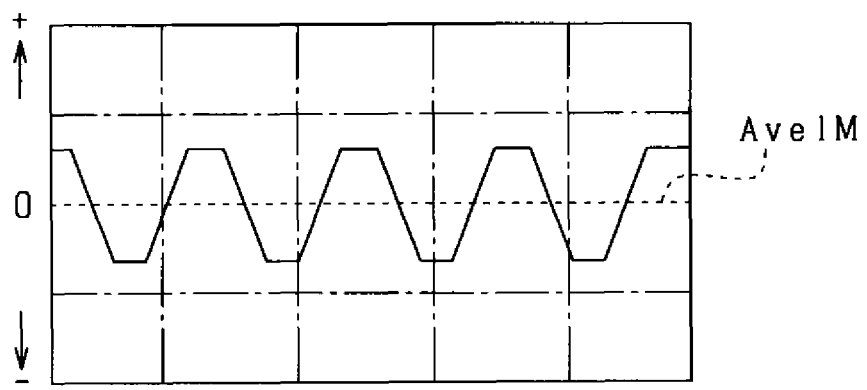
FIGS. 4A and 4B are diagrams showing waveforms of excitation current IM.
Figure 4B:
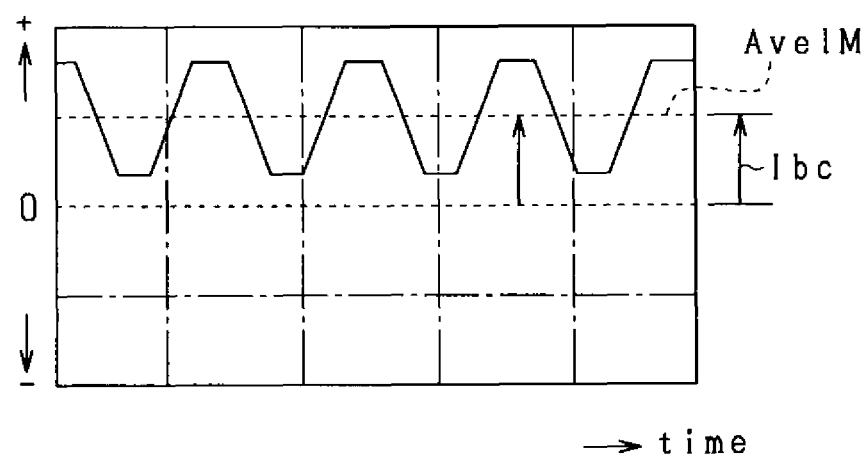

In the case where magnetization bias is produced in the transformer 30, the secondary winding voltage Vt is shifted to the positive side or the negative side so that the in-out balance of the ET product is not 0. The magnetization bias of the transformer is represented by a waveform of the excitation current IM. FIGS. 4A and 4B are diagrams showing waveforms of the excitation current IM. FIG. 4A illustrates excitation current IM when no magnetization bias is produced. FIG. 4B illustrates excitation current IM when magnetization bias is produced. According to the present embodiment, direction of the excitation current IM is defined such that direction along which current flows from a connection point between the third switch Q3 and the fifth switch Q5, to a connection point between the fourth switch Q4 and the sixth switch Q6 is defined as positive. Also, direction of the excitation current IM is defined such that direction along which current flows from a connection point between the fourth switch Q4 and the sixth switch Q6, to a connection point between the third switch Q3 and the fifth switch Q5 is defined as negative.

The excitation current IM is constant in the B mode where the magnetic flux never changes, after the excitation current IM increased in the A mode where the secondary winding voltage Vt is produced. Also, the excitation current IM decreases in the C mode where the negative secondary winding voltage Vt is produced. In the case where magnetization bias is not produced in the transformer 30, the average value of the excitation current IM (i.e., AveIM) becomes 0. On the other hand, when magnetization bias is produced in the transformer 30, the average value AveIM of the excitation current IM is shifted to the positive side or the negative side. In FIG. 4B, the average value AveIM of the excitation current IM is shifted to the positive side. Hereinafter, difference between an average value of the excitation current IM where the magnetization bias is not produced in the transformer 30, and an average value of the excitation current IM where the magnetization bias is produced in the transformer 30 is defined as a magnetization bias current Ibc that indicates an amount of the magnetization bias of the transformer 30. According to the present embodiment, direction of the magnetization bias current Ibc is defined such that the current flowing from the connection point between the third switch Q3 and the fifth switch Q5 to the connection point between the fourth switch Q4 and the sixth switch Q6 is defined as positive. Also, direction of the magnetization bias current Ibc is defined such that the current flowing from the connection point between the fourth switch Q4 and the sixth switch Q6 to the connection point between the third switch Q3 and the fifth switch Q5 is defined as negative.

In the case where the positive ET product of the secondary winding voltage Vt (i.e., ET1+ET2 in FIG. 3) is larger than the negative ET product (i.e., ET3+ET4 in FIG. 3), the magnetization bias current Ibc becomes positive. On the other hand, the positive ET product of the secondary winding voltage Vt is smaller than the negative ET product, the magnetization bias current Ibc becomes negative. Therefore, when predicting the magnetization bias current Ibc, degree of the magnetization bias of the transformer 30 can be calculated.

Next, referring back to FIG. 2, each function of the first acquiring unit 71, the second acquiring unit 72, the prediction unit 73 and the reduction unit 74 in the control unit 60 will be described. The first acquiring unit 71 acquires a secondary side current IH in the A mode as a first current IH1. The second acquiring unit 72 acquires a secondary side current IH in the C mode as a second current IH2.

Assuming the primary side and the secondary side of the transformer 30 have the same magnetomotive force, the first and the second current IH1 and IH2 are expressed by the following equations (3) and (4).

$$IH1=(IH1tr+DC)=IL/N-Ibc \quad (3)$$

$$IH2=(IH2tr+DC)=IL/N+Ibc \quad (4)$$

DC represents an offset error. IH1tr is defined as the first current IH1 when assuming no offset error DC is present, and IH2tr is defined as the second current IH2 when assuming an offset error DC is present. N is the turn ratio of the transformer 30 in which the number of turns of the secondary side is defined as the numerator and the number of turns of the primary side is defined as the denominator.

As shown in the above equations (3) and (4), each of the first and second current IH1 and IH2 includes an offset error superposed thereto. The offset error DC is constant regardless of the current direction. Hence, the first and second current IH1 and IH2 are acquired so as to cancel the offset error DC and difference between the acquired first and second current IH1 and IH2 is calculated, whereby the magnetization bias current Ibc is predicted while the offset error DC is cancelled.

The prediction unit 73 calculates the magnetization bias current Ibc based on the first current IH1 and the second current IH2. Specifically, the magnetization bias current is calculated in accordance with the following equation (5).

$$Ibc=(IH2-IH1)/2 \quad (5)$$

When the first current IH1 is larger than the second current IH2, the magnetization bias current Ibc becomes negative which means that the in-out balance of the ET product of the transformer 30 is deviated to the negative side. On the other hand, when the second current IH2 is larger than the first current IH1, the magnetization bias current Ibc becomes positive, which means in-out balance of the ET product of the transformer 30 is deviated to the positive side.

The reduction unit 74 performs, based on the deviation calculated by the prediction unit 73, a reduction process that controls operation of the first circuit 40 in order to reduce the magnetization bias of the transformer 30. According to the present embodiment, the reduction unit 74 adjusts ON periods of the first and second switches Q1 and Q2 based on the predicted magnetization bias current Ibc so as to cause the ET product of the transformer 30 to be 0.

The reduction unit 74 is provided with a negative feedback divider 101, a PI control unit 102, a limiter 103, an adder 104, and a divider 105. The negative feedback divider 101 subtracts the magnetization bias current Ibc from the target value, and outputs the subtracted value to the PI control unit 102. The PI control unit 102 calculates a first correction value Dbias1 as a control input used in a feedback control that controls the output value of the negative feedback divider 101 to be 0. The first correction value Dbias 1 is used for adjusting the ON periods of the first and second drive command values Dcc 1 and Dcc2 so as to cause the in-out balance of the ET product of the transformer 30 to be 0.

According to the present embodiment, when the magnetization bias current Ibc is in positive side, the PI control unit 102 outputs a negative first correction value Dbias. Also, when the magnetization bias current Ibc is in negative side, the PI control unit 102 outputs a positive first correction value Dbias 1.

The limiter 103 limits the first correction value Dbias 1 outputted from the PI control unit 102 to be within an upper limit value or to be larger than or equal to the lower limit value. The adder 104 adds the first correction value Dbias 1 to the first drive command value Dcc1, thereby setting the first duty command value Duty 1 that defines the ON period of the first switch Q1. The divider 105 divides the second drive command value Dcc2 by the first correction value Dbias 1, thereby setting the second duty value Duty2 that defines the ON period of the second switch Q2.

Next, a reduction process executed by the control unit 60 will be described. FIG. 5 is a flowchart illustrating the reduction process. The process shown in FIG. 5 is repeatedly performed at every predetermined periods.

At step S11, the process acquires the first current IH1. According to the present embodiment, the process acquires, as the first current IH1, the current value detected by the second current sensor 14 at a timing where a predetermined period has elapsed after the second switch Q2 has turned OFF in the A mode. In the A mode, a period from when the second switch Q2 turned OFF to when the first current IH1 is acquired is referred to as a first acquisition period Taq1. Note that step S11 corresponds to first acquiring unit.

At step S12, the process acquires the second current IH2. According to the present embodiment, the process acquires, as the second current IH2, the current value detected by the second current sensor 14 at a timing where a predetermined period has elapsed after the first switch Q1 has turned OFF in the C mode. In the C mode, a period from when the first switch Q1 turned OFF to when the second current IH2 is acquired is referred to as a second acquisition period Taq2. Note that step S12 corresponds to second acquiring unit.

Figure 6:
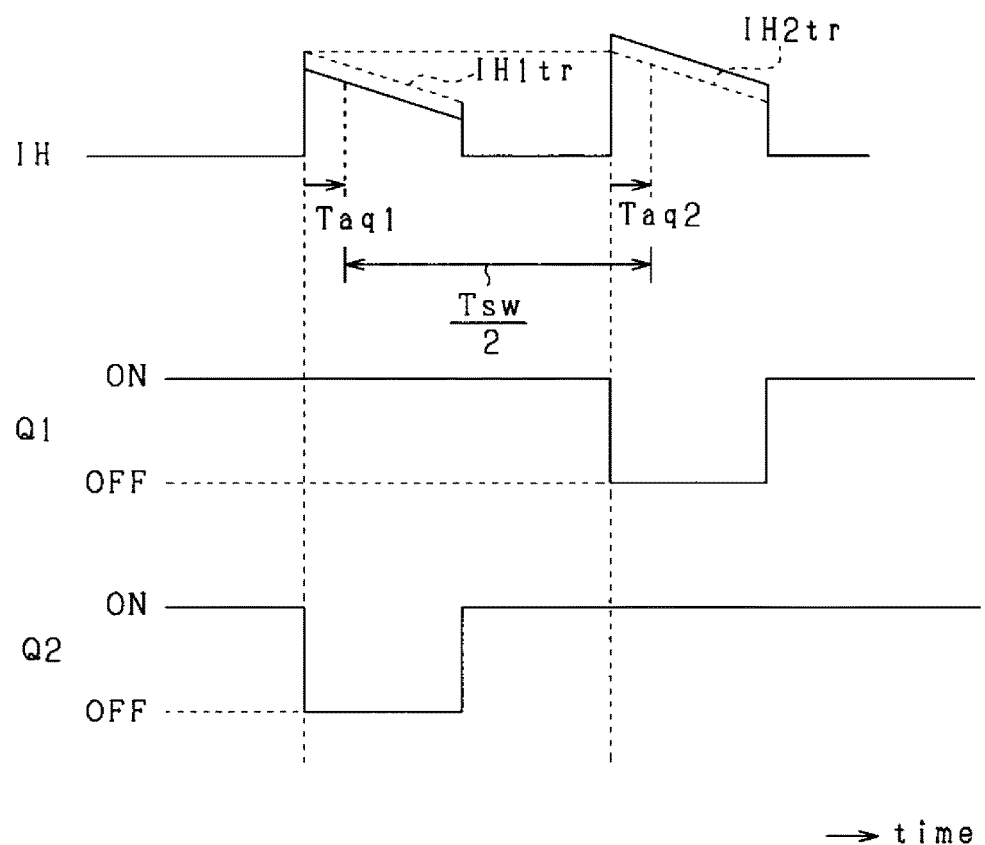
FIG. 6 is a timing diagram showing acquisition timings of first current IH1 and second current IH2.

FIG. 6 is a diagram showing the first and second acquisition timings Taq1 and Taq2. In FIG. 6, the first and second current IH1 and IH2 detected by the second current sensor 14 are illustrated by solid lines. Also, ideal first and second current IH1tr and IH2tr are illustrated by dotted lines when assuming that the magnetization bias current Ibc is not superposed.

The reactor 41 included in the first circuit 40 causes the first and second current IH1 and IH2 to change with respect to time. Hence, without acquiring the first and second current IH1 and IH2 at a timing where the ideal first current IH1tr and the second current IH2tr are the same value, differential value between the first current IH1 and the second current IH2 includes current components other than the magnetization bias current Ibc. According to the present embodiment, acquisition timing of the first current IH1 and the acquisition timing of the second current IH2 are set to be shifted from each other by ½ period of one switching period.

When the state changes from the B mode to the A mode, the second switch Q2 turns OFF, whereby noise is superposed to the secondary side current IH. Moreover, when the state changes from B mode to the C mode, the first switch Q1 turns OFF, whereby noise is superposed to the secondary side current IH. For this reason, the first and second acquisition periods Taq1 and Taq2 are set in a period excluding a period where noise is superposed to the first and second current IH1 and IH2 after turning OFF the first switch Q1 and the second switch Q2.

At step S13, with the difference between the first current IH1 acquired at step S11 and the second current IH2 acquired at step S12, the process predicts the magnetization bias current Ibc. According to the present embodiment, the magnetization bias current Ibc is predicted by using the above-described equation (5). Step S13 corresponds to prediction unit.

At step S14, the process calculates the first correction value Dbias1 based on the magnetization bias current Ibc predicted at step S13. According to the present embodiment, the magnetization bias current Ibc predicted at step S13 is inputted to the PI control unit 102, thereby setting the output of the PI control unit 102 to be the first correction value Dbias1. The first correction value Dbias1 outputted from the PI control unit 102 is inputted to the limiter 103, and outputted as being limited within a range defined by the upper limit value and the lower limit value.

At step S15, the process calculates the first and second drive command values Dcc1 and Dcc2. At step S16, the ON periods set by the first and second drive command value Dcc1 and Dcc2 calculated at step S15 are adjusted by using the first correction value Dbias1 calculated at step S14. Then adjusted value is set as the first duty command value Duty1 of the first switch Q1. According to the present embodiment, as shown in FIG. 2, the first drive command value Dcc1 and the first correction value Dbias1 are inputted to the adder 104 and the output of the adder 104 is set to be the first duty command value Duty1.

At step S17, the ON period set by the second drive command value Dcc2 is adjusted by using the first correction value Dbias1. Then, the adjusted value is set to be the second duty command value Duty2 of the second switch Q2. According to the present embodiment, as shown in FIG. 2, the second drive command value Dcc2 and the first correction value Dbias1 are inputted to the divider 105 and the output of the divider 105 is set to be the second duty command value Duty2.

At step S18, the process sets the third duty command value Duty3 which sets the ON period of the third switch Q3, and the sixth duty command value Duty6 which sets the sixth switch Q6. Also, at step S19, the process sets the fourth duty command value Duty4 which sets the ON period of the fourth switch Q4, and the fifth duty command value Duty5 which sets the fifth switch Q5. According to the present embodiment, the third to fifth duty command value Duty3 to Duty 5 are 0. Hence, the third to fifth switches Q3 to Q5 are kept in an OFF state.

At step S20, the process drives the first to sixth switches Q1 to Q6 by using the first to sixth duty command values 1 to 6. At this time, first and second switches Q1 and 2 are driven by using the first and second duty command values Duty1 and Duty2 which are adjusted at steps S16 and S17. Steps S14 to S20 correspond to reduction unit.

Next, with reference to an operation sequence shown in FIGS. 7A to 7F, effects of a reduction of the magnetization bias of the transformer 30 performed by the process of step S20 will be described. FIGS. 7A to 7F correspond to the above-mentioned FIGS. 3A to 3F.

Figure 7:
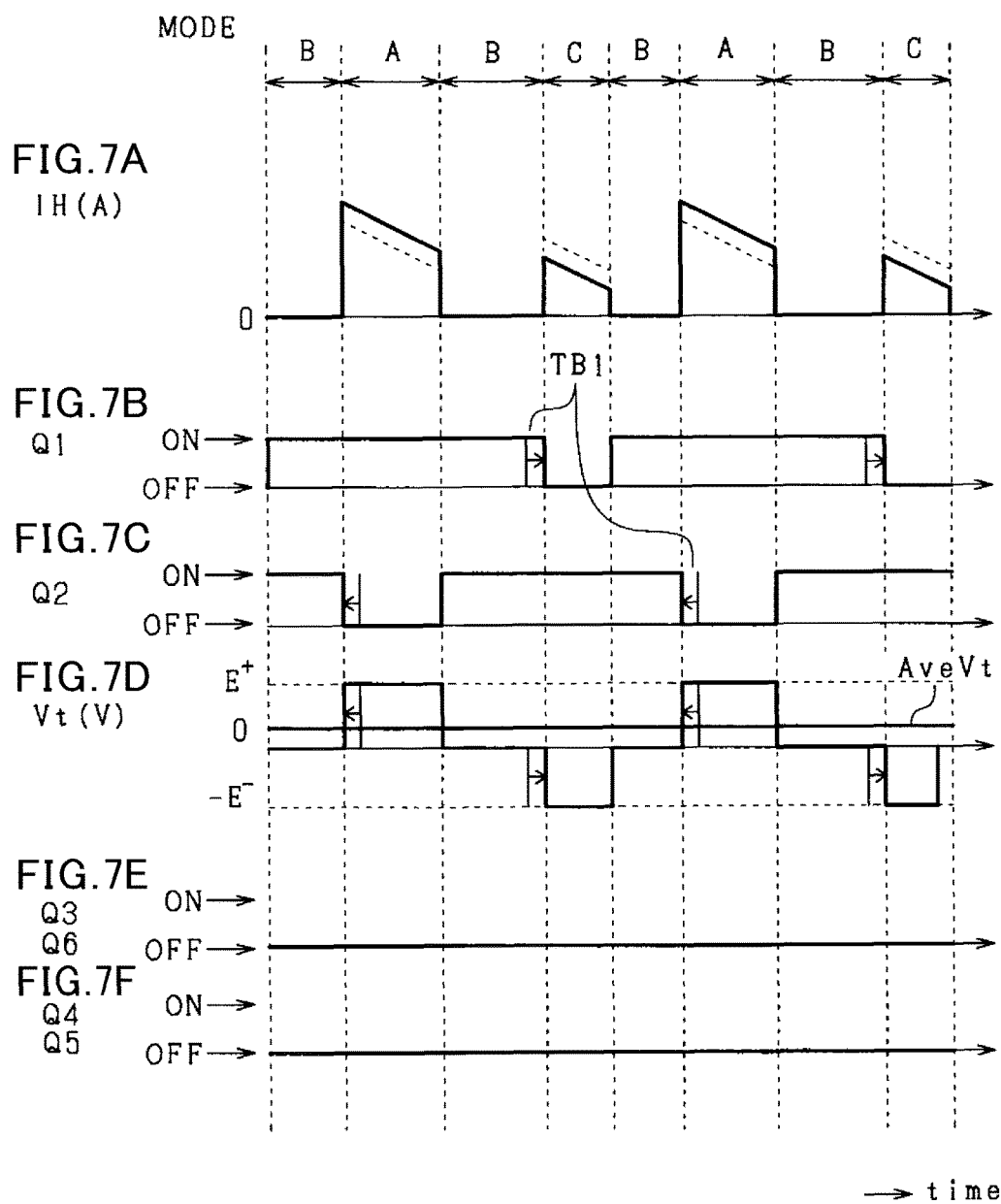
FIGS. 7A to 7F are timing diagrams illustrating operation sequence of the reduction process.

In FIGS. 7A and 7B, a case is described in which the magnetization bias current Ibc is negative. In FIG. 7A, the secondary side current IH is exemplified with a dotted line when assuming no magnetization bias being produced, and actual secondary side current IH is exemplified. Since the magnetization bias current Ibc is negative, the secondary side current IH in the A mode is larger than the secondary side current IH in the C mode.

The magnetization bias current Ibc is predicted as a negative value, the first correction value Dbias1 indicates a positive value. As a result, the first switch Q1 is turned ON for an ON period longer than the ON period set by the first drive command value Dcc1 by a period TB1 in accordance with the first drive command value Dcc2. Further, the second switch Q2 is turned ON for an ON period shorter than the ON period set by the second drive command value Dcc2 by a period TB1 in accordance with the first correction valueDbias 1. Hence, a period of the A mode increases in which the first switch Q1 is independently ON, and a period of the C mode decrease in which the second switch Q2 is independently ON, thereby increasing the average value AveVt of the winding voltage Vt of the transformer 30. As a result, the ET product of the transformer 30 in the positive side increases and the ET product of the transformer 30 in the negative side decreases, whereby the in-out balance of the ET product is improved and the magnetization bias is reduced.

According to the above-described embodiment, the following effects and advantages can be obtained.

The control unit 60 predicts the magnetization bias current Ibc by using a difference between the first current IH1 and the second current IH2, thereby cancelling the offset error DC. Then, the control unit 60 controls a drive mode of the first circuit 40 based on the predicted magnetization bias current Ibc so as to reduce the magnetization bias of the transformer 30. In this case, since the offset error DC superposed to the first and second current IH1 and IH2 can be cancelled, accuracy for predicting the magnetization bias current Ibc can be improved. As a result, the magnetization bias of the transformer 30 can be appropriately reduced.

The ET product indicating voltage-time product of a voltage transmitted through the transformer 30 is adjusted, whereby deviation of magnetic flux of the transformer 30 can be adjusted. In this respect, the control unit 60 performs, based on the predicted magnetization bias current Ibc, an adjustment process that adjusts at least one of the ON periods corresponding to the first switch Q1 and the second switch Q2. In this case, existing configuration can be employed by using ON periods of the first switch Q1 and the second switch Q2 so that the magnetization bias of the transformer 30 can be reduced.

The control unit 60 performs an average current mode control in which ON periods of the first switch Q1 and the second switch Q2 are set to cause an amount of current flowing into the second current 50 to be a predetermined value. Then, the control unit 60 adjusts the ON period which is set in the average current mode control based on the predicted magnetization bias current Ibc. Thus, even when the ON periods of the first and second switches Q1 and Q2 are set in the average current mode control, the magnetization bias of the transformer 30 can be reduced.

In a predetermined period after the first and second switches Q1 and Q2 are independently turned ON, noise is superposed on the secondary side current IH. In the case where noise is superposed to the first and second current IH1 and IH2, accuracy for predicting magnetization bias current Ibc is lowered. This is not desirable. In this respect, the control unit 60 acquires each of the first and second current IH1 and IH2 in the A mode or the B mode, at a timing after the first acquisition period Taq1 or the second acquisition period Taq2 has elapsed after the first switch Q1 or the second switch Q2 independently turns ON from the OFF state. In this case, the accuracy for predicting the magnetization bias current Ibc caused by noise can be prevented from lowering.

In a configuration in which a boost operation is conducted via the transformer 30, the secondary side current IH flowing through the second circuit 50 is smaller than the primary side current IL that flows through the first circuit 40. For this reason, the control unit 60 acquires the detection result of the second current sensor 14 disposed in the second circuit 50 as the first current IH1 and the second current IH2. In this case, the rated current of the second current sensor 14 can be small, thereby reducing the size thereof. Accordingly, the size of the DDC90 can be smaller as well.

The acquisition timing of the first current IH1 by the first acquiring unit 71 and the acquisition timing of the second current IH2 by the second acquiring unit 72 are shifted from each other by ½ period of the first switching period Tsw. In this case, prediction accuracy can be improved for the magnetization bias current Ibc which is calculated based on a difference between the first current IH1 and the second current IH2.

(Modification of First Embodiment)

The prediction unit 73 shown in FIG. 2 may calculate a deviation between the first current IH1 and the second current IH2 and output the deviation. In this case, the PI control unit 102 may calculate the first correction value Dbias as a control input used for a feedback control to control the calculated deviation to be 0.

(Second Embodiment)

According to the second embodiment, configurations different from that of the first embodiment will mainly be described.

According to the second embodiment, the control unit 60 performs a peak current mode control in which OFF timings of the first and second switches Q1 and Q2 are set based on the peak value of the primary side current IL flowing through the first circuit 40.

Figure 8:
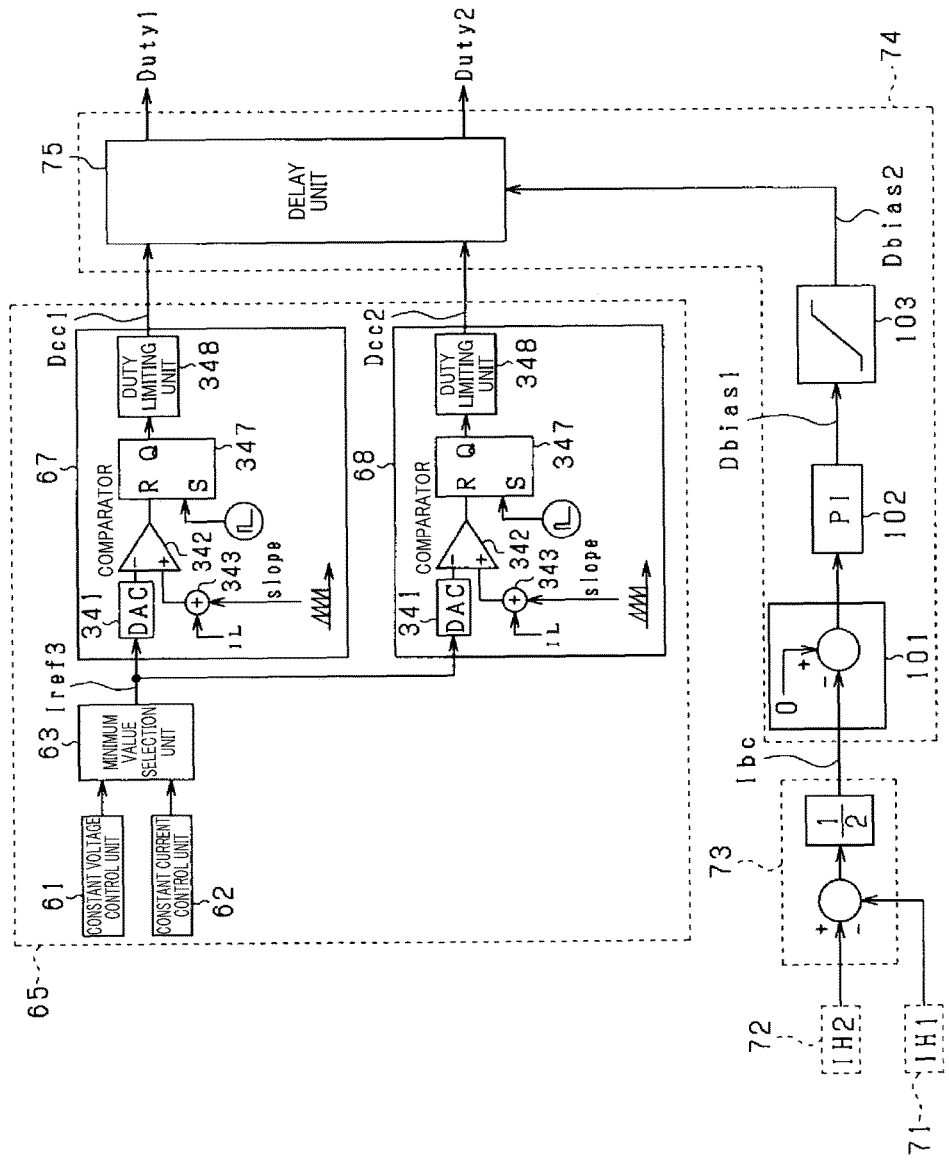
FIG. 8 is a block diagram showing functions of the control apparatus.

FIG. 8 is a functional block diagram illustrating a function of a peak current mode control in functions of the control unit 60. In FIG. 8, the primary side setting unit 65 is provided with a first peak current mode control unit 67 that sets the first drive command value Dcc1 of the first switch Q1, and a second peak current mode control unit 68 that sets the second drive command value Dcc2 of the second switch Q2.

The first peak current mode control unit 67 is provided with a DA converter 341, a comparator 342, an adder 343, a RS flipflop 347, and a Duty limiting unit 348. First, the command current value Iref3 selected by the minimum value selection unit 63 is inputted to the DA converter 34. The DA converter 341 converts the inputted command current value Iref3 which is a digital value to be an analog value. The command current value Iref3 converted to the analog value is inputted to the inverting input terminal of the comparator 342. The adder 343 adds the primary side current IL and slope compensation signal Slope and outputs the added value as a post compensation switching current. The output signal of the adder 343 is inputted to the non-inverting input terminal of the comparator 342. Note that the slope compensation signal reduce oscillation caused by current flowing through the reactor 41.

According to the present embodiment, the command current value Iref3 is used as a peak value of the primary side current IL. Specifically, the comparator 342 compares the command current value Iref3 and post compensation switching current, a low signal to the R terminal of the RS flipflop 347 during a period in which the post compensation switch current is smaller than the command current value Iref3. Moreover, a clock signal is inputted to the S terminal of the RS flipflop. The upper limit of the duty is set to the output of the RS flipflop 347 by the Duty limiting unit 348. Then the output of the RS flipflop 347 is outputted as the first drive command value Dcc1.

Similar to the first peak current mode control unit 67, the second peak current mode control unit 68 is provided with a DA converter 341, a comparator 342, a RS flipflop 347, and a Duty liming unit 348. For the output of the RS flipflop 347 of the second peak current mode control unit 68, the upper limit of the duty is set by the Duty limiting unit 348. Then the output of the RS flipflop 347 is outputted as the second drive command value Dcc2.

In the peak current mode control performed by the control unit 60, On periods of the first and second drive command values Dcc1 and Dcc2 are set such that the primary side current IL does not exceed the command current value Iref3 as the peak value. Therefore, even in the case where an electrical load to be supplied with power varies, the electrical load being connected to the output side of the DDC90, the peak current mode control is an effective way to reduce over-current flowing through the first circuit 40. Therefore, according to the peak current mode control, an increase of the rated current of the DDC90 can be reduced and the size of the DDC 90 can be reduce as well.

According to the present embodiment, the reduction unit 74 includes a delay unit 75 that adjusts ON periods by performing a delay-correction of the OFF timing, the OFF timing being set by the first and second peak current mode control unit 67 and 68. The delay unit 75 performs a delay-correction of the OFF timing for either the first switch Q1 or the second switch Q2, based on a direction indicated by the positive or negative sign of the second correction value Dbias 2 (i.e., corresponds to amount of delay-correction) calculated in accordance with the magnetization bias current Ibc. The delay unit 75 performs a delay-correction of the OFF timing determined by the second drive command value Dcc2 among the first and second drive command values Dcc1 and Dcc2 when the second correction value Dbias2 is positive. Also, the delay unit 75 performs a delay-correction of the OFF timing determined by the second drive command value Dcc2 among the first and second drive command values Dcc1 and Dcc2 when the second correction value Dbias2 is negative.

Figure 9:
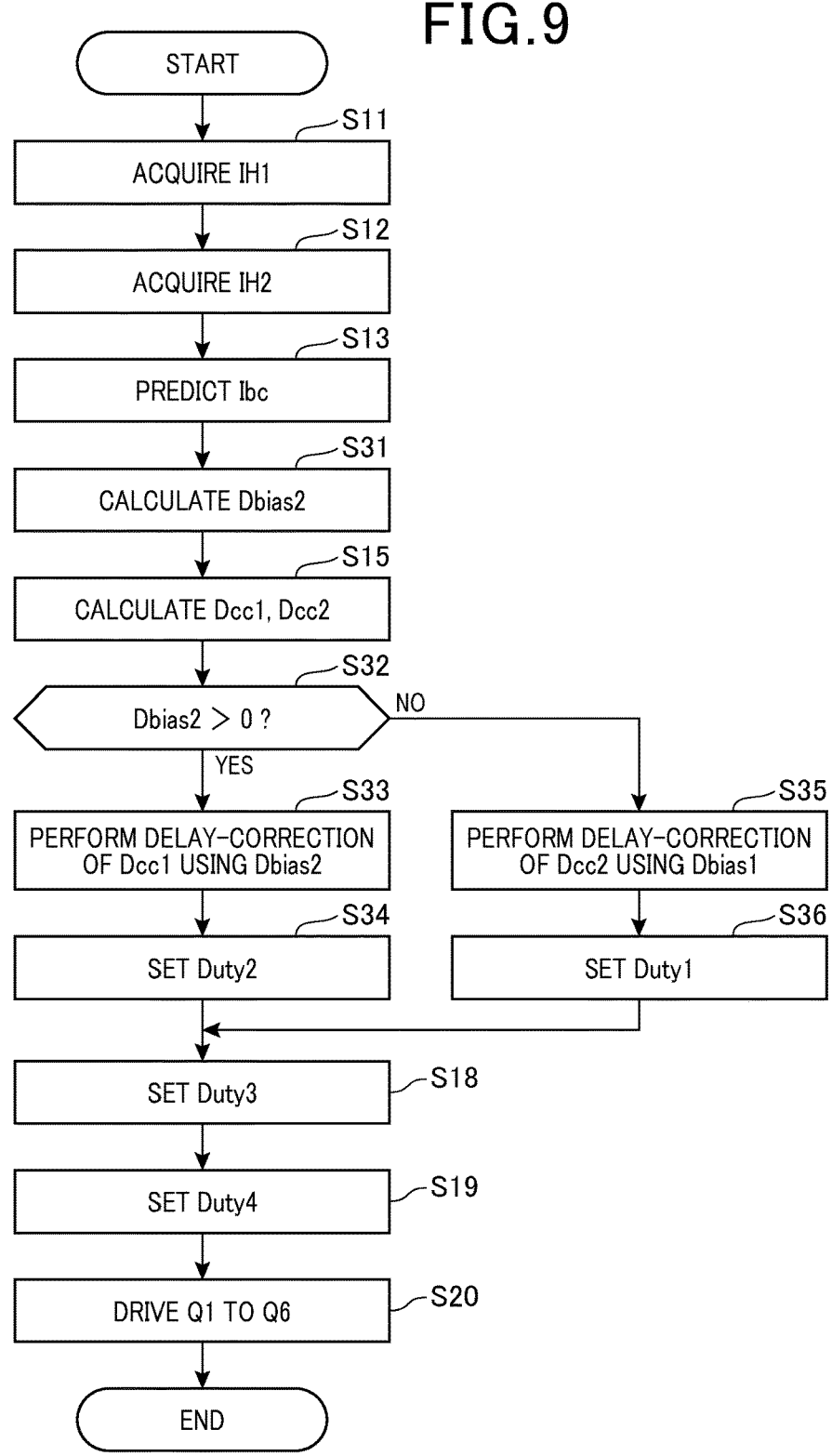
FIG. 9 is a flow chart illustrating a reduction process according to a second embodiment.

Next, a reduction process according to the second embodiment will be described with reference to FIG. 9. A process illustrated in FIG. 9 is repeatedly executed at predetermined periods. In FIG. 9, the same step numbers are applied to the same processes as those of FIG. 5 for the sake of convenience.

At step S31, the process calculates, based on the magnetization bias current Ibc predicted at step S13, the second correction value Dbias2 that determines a delay time of the OFF timing of the first and second switches Q1 and Q2. According to the present embodiment, the PI control unit 102 calculates the second correction value Dbias 2.

At step S32, the process determines the sign of the second correction value Dbias2 calculated at step S31, and proceeds to step S33. At step S33, the process sets the first duty command value Duty 1 which is a delay-corrected value of the OFF timing corresponding to the ON period determined by the first drive command value Dcc1, the delay-corrected value being delay-corrected by the second correction value Dbias2.

When the second correction value Dbias2 is negative, the process proceeds to step S35. At step S35, the process sets the second duty command value Duty 2 which is a delay-corrected value of the OFF timing corresponding to the ON period determined by the second drive command value Dcc2, the delay-corrected value being delay-corrected by the second correction value Dbias2.

At step S20, the first to sixth switches Q1 to Q6 are driven. At this moment, the first and second switches Q1 and Q2 are driven, by using the first and second duty values Duty1 and Duty2 which are set in steps S33 and S34, or steps S35 and S36. When the process at step S20 is terminated, the process shown in FIG. 8 is temporarily terminated.

Figure 10:
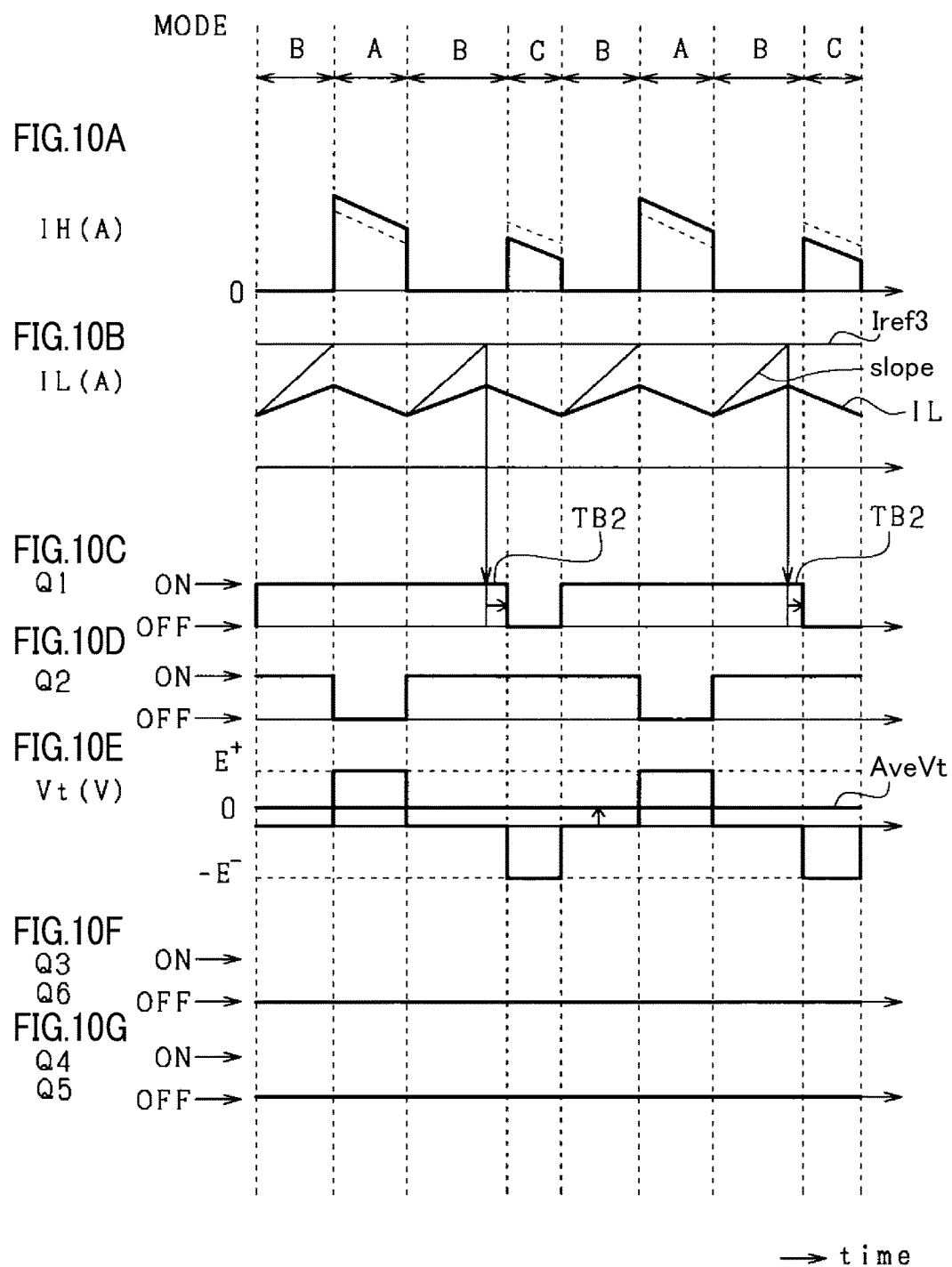
FIGS. 10A to 10G are timing diagrams illustrating operation sequence of the reduction process according to the second embodiment.

Next, a reduction effect of the magnetization bias of the transformer 30 at step S20 will be describe with reference to the operation sequence shown in FIGS. 10A to 10G. FIG. 10A shows a graph showing a change in the secondary side current IH. FIG. 10B shows a trend of the primary side current IL. FIG. 10C shows a trend of a drive state of the first switch Q1. FIG. 10D shows a trend of a drive state of the second switch Q2. FIG. 10E shows a trend of the secondary winding voltage Vt. FIG. 10F shows a trend of a drive state of the third and sixth switch Q3 and Q6. FIG. 10G shows a trend of a drive state of the fourth and fifth switch Q4 and Q5. Note that the primary side current IL is indicated by a waveform having an increase section and a decrease section which is repeated at predetermined periods for the sake of convenience.

FIGS. 10A to 10G exemplify that the magnetization bias current Ibc is in negative side. FIG. 10A shows secondary side current IH with a dotted line when assuming no magnetization bias has occurred, and actual secondary side current IH is shown with a solid line. Since the magnetization bias current Ibc is negative, the secondary side current IH in the A mode is larger than the secondary side current IH in the C mode.

The magnetization bias current Ibc is predicted to be negative so that the second correction value Dbias2 becomes a positive value. Therefore, the control unit 60 delays the OFF timing of the first switch Q1 by using the second correction value Dbias2. In FIG. 10C, the OFF timing of the first switch Q1 is delayed, by the second correction value Dbias2, from a timing at which a post correction switch current resulting from the addition of the primary side current IL and the slope compensation signal Slope reaches the command current value Iref3. Meanwhile, the OFF timing of the second switch Q2 equals to a timing at which the post switching current resulting from an addition of the primary side current IL and the slope compensation signal Slope reaches the command current value Iref3.

Because of the delay time of the first switch Q1, the period of the C mode decreases. Hence, a period where the second switch Q2 independently is ON decreases and the average value AveVt of the secondary winding voltage Vt increases towards the positive side. As a result, the negative ET product of the transformer 30 decreases, whereby the magnetization bias is reduced.

The above-described power conversion system 10 according to present embodiment has the following effects and advantages.

The control unit 60 performs a peak current mode control in which OFF timing of the first and second switches Q1 and Q2 are set such that current flowing through the first circuit 40 does not exceeds the first current 40. Also, the control unit 60 performs a delay-correction of the OFF timing of the first and second switches Q1 and Q2 based on the predicted magnetization bias current Ibc, thereby adjusting the ON period. In this case, since both of the reduction process of the control unit 60 and the peak current mode control are present, effect of reducing size of the DDC90 by the peak current mode control and effect of reducing size of the transformer 30 can be obtained.

The control unit 60 performs a delay-correction of either the OFF timing of the first switch Q1 or the OFF timing of the second switch Q2, in accordance with whether positive or negative sign of the second correction value Dbias2 based on the predicted magnetization bias current Ibc. According to the above-described configuration, since only the OFF timing of either the first switch Q1 or the second switch Q2 has to be changed, the required time for the reduction process can be shortened.

(Third Embodiment)

According to the third embodiment, configurations different from that of the first embodiment will mainly be described.

According to the third embodiment, ON periods of the third to sixth switches Q3 to Q6 of the second circuit 50 are change, whereby the ET product is adjusted and the magnetization bias is reduced.

In the A mode, when the third and sixth switches Q3 and Q6 are OFF, the secondary winding voltage Vt produced on the third coil 33 is calculated in accordance with the following equation (6).

$$Vt(Aoff) = VHr + Vf1 + Vf4 \quad (6)$$

Vt (Aoff) is secondary winding voltage Vt when both of the third switch Q3 and the sixth switch Q6 are OFF. Vf1 and Vf4 are forward direction voltage of the first and fourth reflux diodes D1 and D4 respectively.

In the A mode, the secondary winding voltage Vt when both of the third and sixth switches Q3 and Q6 are ON is calculated in accordance with the following equation (7).

$$Vt(Aon) = VHr + Vrom3 + Vrom6 \quad (7)$$

Vt (Aon) is the secondary winding voltage Vt when the third and sixth switches Q3 and Q6 are ON in the A mode. Vrom3 and Vrom6 are defined as each voltage drop of ON resistance when current flows through the third and sixth switches Q3 and Q6. The voltage drops Vrom3 and Vrom6 are smaller than those of the forward direction voltages Vf1 and Vf4.

The secondary winding voltage Vt in the C mode is calculated in accordance with the following equations (8) and (9).

$$Vt(Coff) = VHr + Vf2 + Vf3 \quad (8)$$

$$Vt(Con) = VHr + Vrom4 + Vrom5 \quad (9)$$

Vt(Coff) is the secondary winding voltage Vt when both of the fourth and fifth switches Q4 and A5 are OFF in the C mode. Vf2 and Vf3 are forward direction voltage of the second and third reflux diodes D2 and D3. Vt (Con) is the secondary winding voltage Vt when both of the fourth and fifth switches Q4 and Q5 are ON in the C mode. Vrom4 and Vrom5 are defined as each voltage drop of ON resistance when current flows through the fourth and fifth switches Q4 and Q5. The voltage drops Vrom4 and Vrom5 are smaller than that of the forward direction voltages Vf2 and Vf3.

With the above-equations (6) and (7), ON periods of the third and sixth switches Q3 and Q6 are adjusted, whereby the secondary winding voltage Vt can be changed to be Vt (Aoff) or Vt (Aon). Also, with the above-equations (8) and (9), ON periods of the fourth and fifth switches Q4 and Q5 are adjusted, whereby the secondary winding voltage Vt can be changed to Vt (Coff) or Vt (Con). Accordingly, ON periods of the third to sixth switches Q3 to Q6 are adjusted, whereby the ET product of the transformer 30 can be adjusted.

Figure 11:
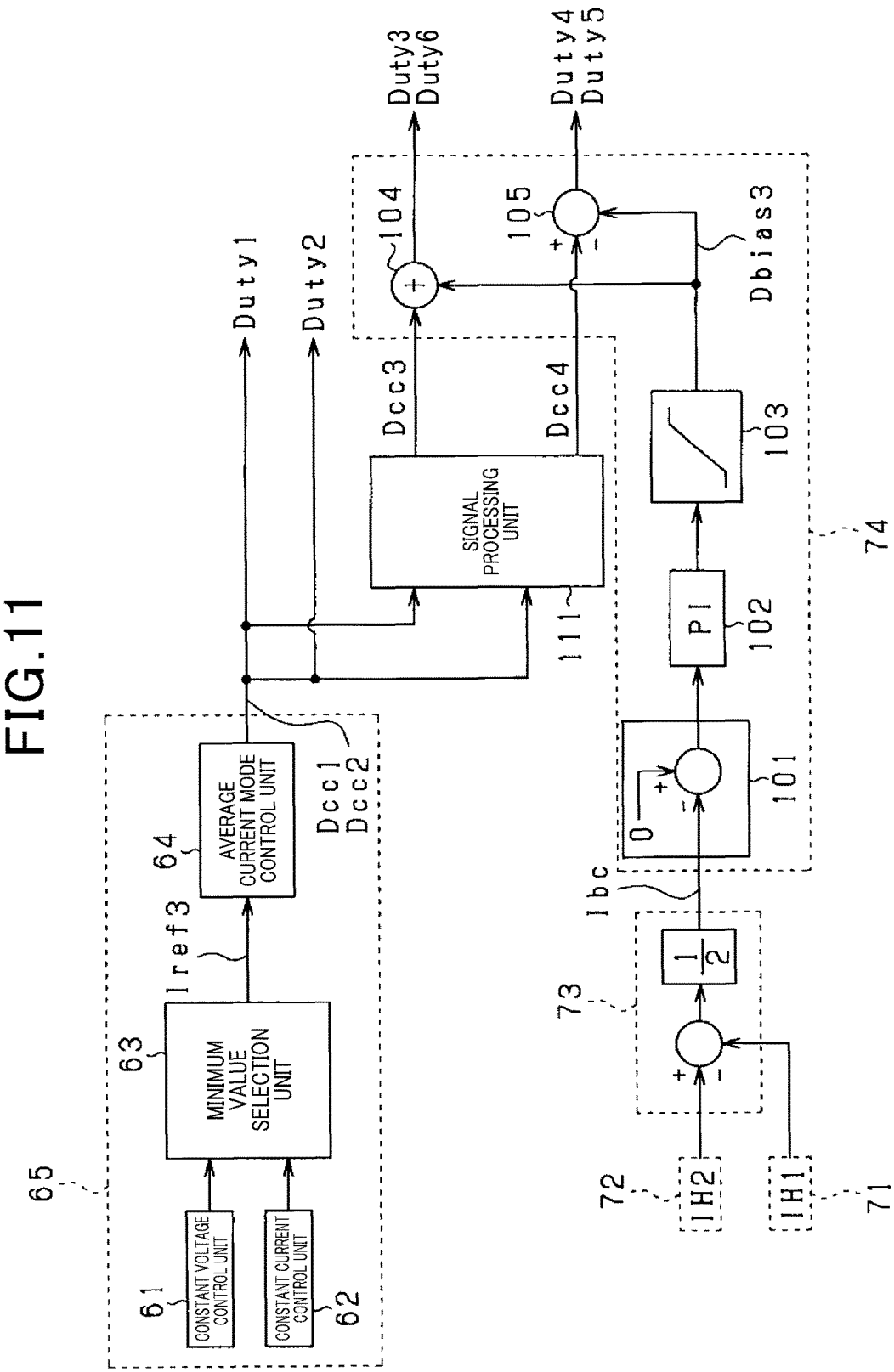
FIG. 11 is a block diagram showing function of a control apparatus according to a third embodiment.

FIG. 11 is a block diagram showing each function of the control unit 60 according to the third embodiment. The control unit 60 includes a signal processing unit 111 that sets a third drive command value Dcc3 determining ON periods of the third and sixth switches Q3 and Q6, a fourth drive command value Dcc4 determining ON periods of the fourth and fifth switches Q4 and Q5. According to the present embodiment, the signal processing unit 111 sets the third drive command value 3 based on the first duty command value Duty1. Also, the signal processing unit 111 sets the fourth drive command value Dcc4 based on the second duty command value Duty2.

Figure 12:
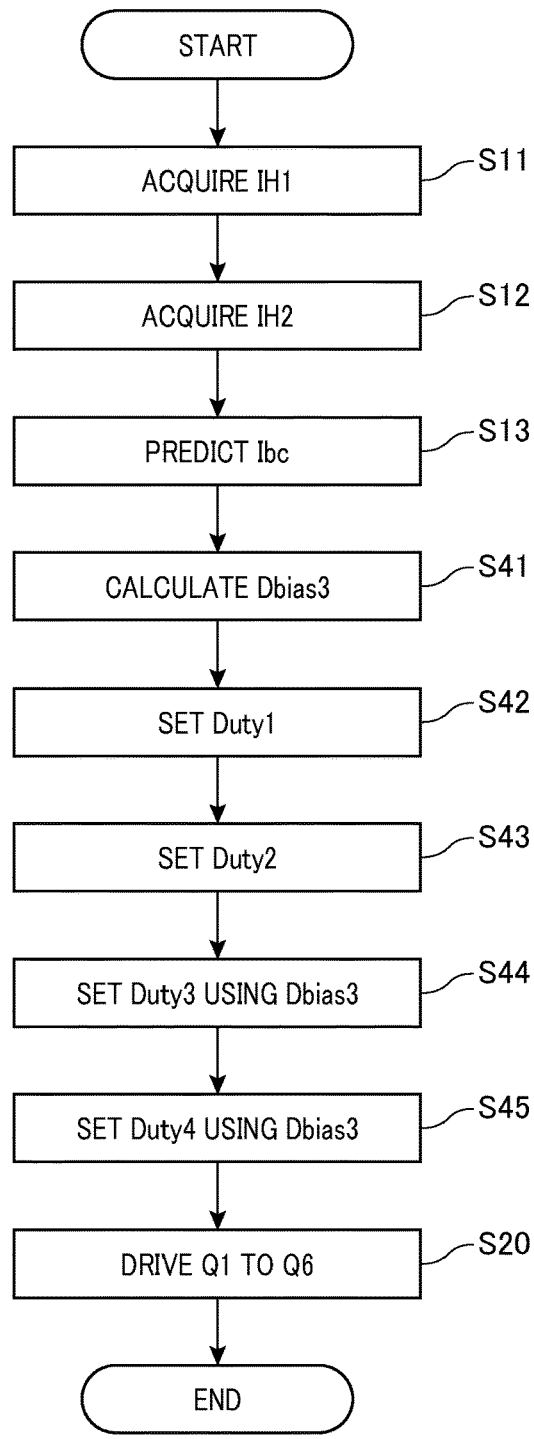
FIG. 12 is a flow chart illustrating the reduction process according to the third embodiment.

FIG. 12 is a flowchart showing a reduction process executed by the control unit 60 in the third embodiment. The process shown in FIG. 12 is repeatedly executed by the control unit at predetermined periods.

At step S41, the process calculates, based on the magnetization bias current Ibc predicted at step S13, the third correction value Dbias3 in order to adjust the ON periods of the third to sixth switches Q3 to Q6 of the second circuit 50.

At step S42, the process sets the first command value Duty1 determining the ON period of the first switch Q1. According to the present embodiment, the process sets the first drive command value Dcc1 to be the first duty value Duty1. At step S43, the process sets the second duty command value Duty2 that determines the ON period of the second switch Q2.

At step S44, the process sets the adjusted value with the third correction value Dbias3 to be the third and sixth duty command value Duty 3 and Duty 6 for the ON period sets by the third drive command value Dcc3. According to the present embodiment, as shown in FIG. 11, the third drive command value Dcc3 and the third correction value Dbias3 are inputted to the adder 104, and sets the output of the adder 104 to be the third and sixth duty command values Duty 3 and Duty 6.

At step S45, the process sets the adjusted value with the third correction value Dbias3 to be the fourth and fifth duty command value Duty 4 and Duty 5 for the ON period sets by the fourth drive command value Dcc4. According to the present embodiment, as shown in FIG. 11, the fourth drive command Dcc4 and the third correction value Dbias3 are inputted to the divider 105, and sets the output of the divider 105 to be the fourth and fifth duty command value Duty 4 and Duty 6.

At step S20, the process drives the first to sixth switches Q1 to Q6 based on the first to sixth duty command value Duty 1 to Duty 6. When the process of step S20 is completed, the process temporarily terminates the process shown in FIG. 12.

Next, with reference to operation sequence shown in FIGS. 13A to 13F, effects obtained by the process of step S20 in the third embodiment will be described, where the magnetization bias in the transformer 30 is reduced. Note that FIGS. 13A to 13F correspond to the above-mentioned FIGS. 3A to 3F.

Figure 13:
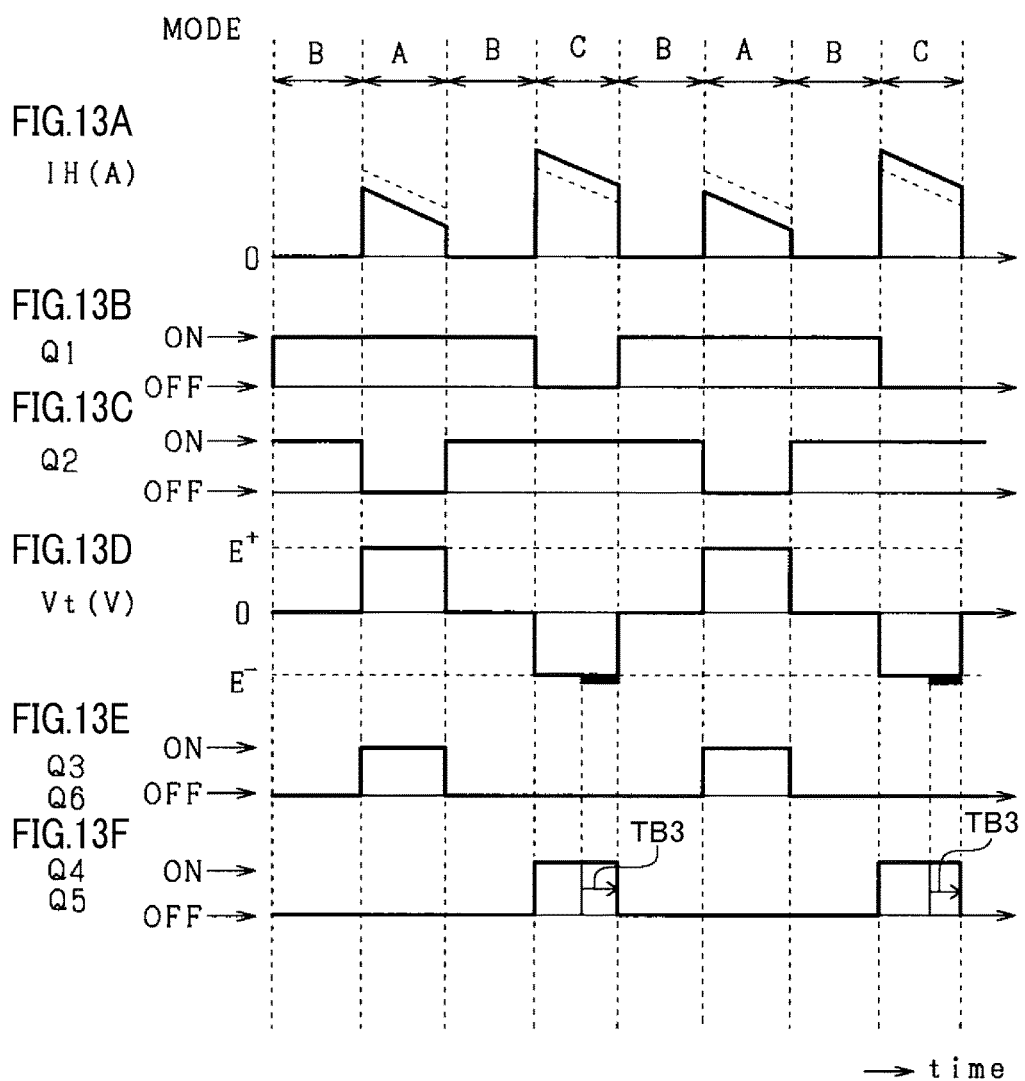
FIGS. 13A to 13F are timing diagrams illustrating operation sequence of the reduction process according to the third embodiment.
Figure 14:
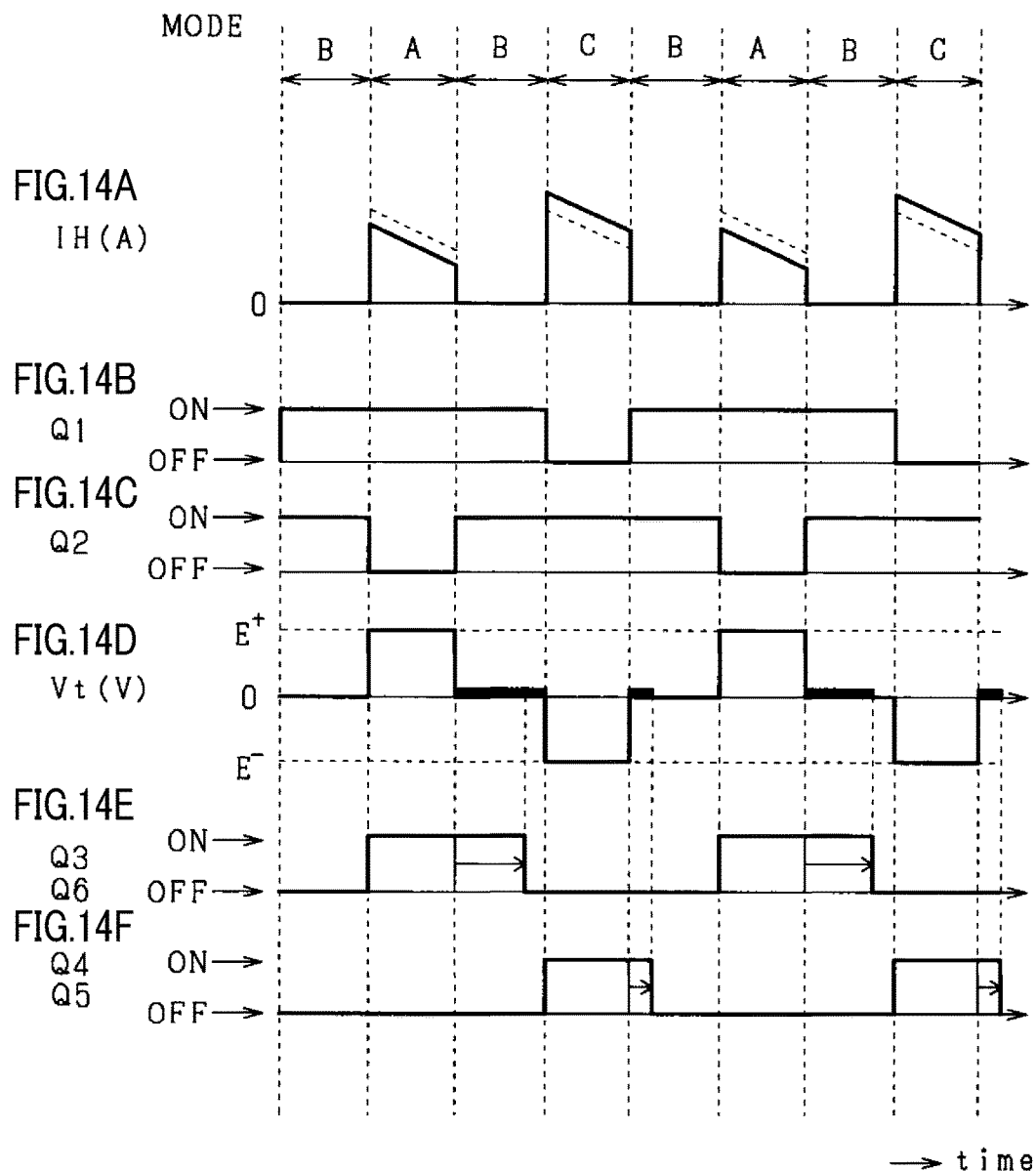
FIGS. 14A to 14F are timing diagrams illustrating operation sequence of a reduction process according to a modification example.

FIGS. 13A to 13F exemplifies a case where the magnetization bias current Ibc is positive side. FIG. 13A shows secondary side current IH with a dotted line when assuming no magnetization bias has occurred, and the actual secondary side current IH is shown with a solid line. Since the magnetization bias current Ibc is positive, the secondary side current IH in the A mode is larger than the secondary side current IH in the C mode.

Since the magnetization bias current Ibc is positive, the ON periods of the third to sixth switches Q3 to Q6 are adjusted such that in-out balance of the ET product during one switching period is reduced. As shown in FIG. 13F, during the C mode, the ON periods of the fourth and fifth switches Q4 and Q5 are extended by a period TB3 produced in accordance with the third correction value Dbias3. As a result, during the extended period in the C mode where the ON periods of the fourth and fifth switches Q4 and Q5 are extended, the secondary winding voltage decreases by a voltage difference between a voltage drop of the second and third reflux diodes D2 and D3 and a voltage drop Vrom4 and Vrom5 due to ON resistance of the fourth and fifth switches Q4 and Q5. As a result, in-out balance of the ET product of the transformer 30 decreases so that the magnetization bias is reduced.

According to the above-described configuration, the power conversion system 10 of the present embodiment can obtain the following effects and advantages.

The ON periods of the third to sixth switches Q3 to Q6 are adjusted so that the magnetization bias of the transformer 30 can be reduced. Therefore, the reduction process can be performed without changing the periods of the A mode and the C mode.

(Modification of Third Embodiment)

In the third embodiment, the ON periods of the third to sixth switches Q3 to Q6 may be adjusted with the B mode. In the B mode in which the first and second switches Q1 and Q2 are both ON, the secondary winding voltage Vt is not exactly 0 so that current flows through the second circuit 50. Hence, even in the B mode, by adjusting the ON periods of the third to sixth switches Q3 to Q6, the secondary winding voltage Vt can be adjusted.

FIGS. 14A to 14F are an operation sequence illustrating a reduction process of the transformer 30 according to the modification. In FIGS. 14A to 14F, the ON periods of the third and sixth switches Q3 and Q6 are extended to the B mode from the A mode. Also, the ON periods of the fourth and fifth switches Q4 and Q5 are extended to the B mode from the C mode. Therefore, during the ON periods of the third and sixth switches Q3 and Q6 in the B mode, the secondary winding voltage Vt increases by a voltage difference between a voltage drop of the first and fourth reflux diodes D1 and D4 and a voltage drop of the Vrom3 and Vrom6 due to the ON resistance of the third and sixth switches Q3 and Q6. Moreover, during the ON periods of the fourth and fifth switches Q4 and Q5 in the C mode, the secondary winding voltage Vt increases by a voltage difference between a voltage drop of the second and third reflux diodes D2 and D3 and a voltage drop of the Vrom4 and Vrom5 due to the ON resistance of the fourth and fifth switches Q4 and Q5. As a result, the ET product of the transformer 30 can be adjusted and the magnetization bias can be reduced.

(Fourth Embodiment)

According to the fourth embodiment, configurations different from that of the first embodiment will mainly be described.

According to the fourth embodiment, the first acquisition period Taq1 that determines an acquiring timing of the first current IH1, and the second acquiring period Taq2 that determines an acquiring timing of the second current IH2 are independently set. Then, correction is made such that either one acquiring timing between the first and second acquiring timings Taq1 and Taq2 is defined as a reference and the other acquiring timing is defined as another reference so as to acquire the secondary current IH at these timings. Accordingly, prediction accuracy of the magnetization bias current Ibc can be prevented from being lowered.

Figure 15:
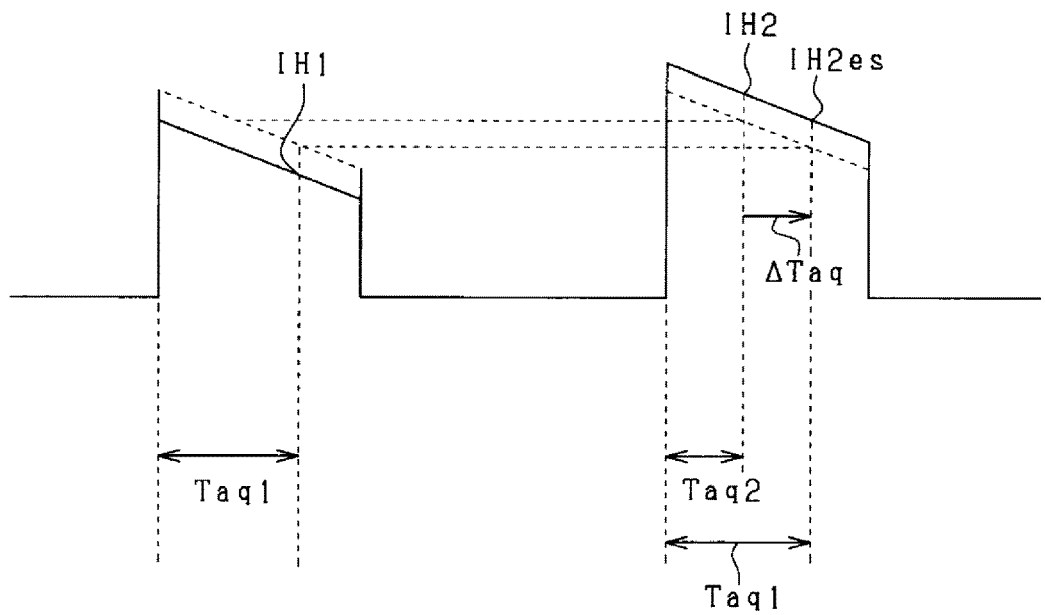
FIG. 15 is a timing diagram showing acquisition timings of first current IH1 and second current IH2 according to a fourth embodiment.
Figure 16:
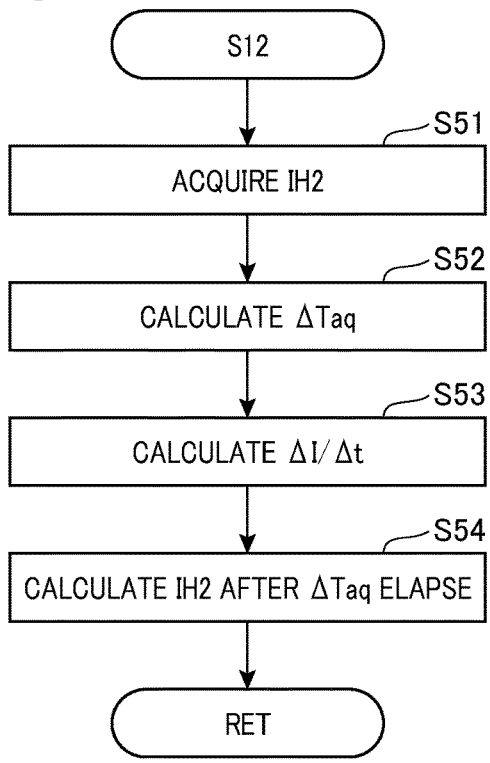
FIG. 16 is a flow chart showing a process executed at step S12 shown in FIGS. 4A and 4B according to the fourth embodiment.

FIG. 15 is a diagram illustrating a variation of acquiring timings Taq of the first and second current IH1 and IH2 in the A mode and the B mode. In FIG. 15, the first acquiring timing Taq1 is larger than the second acquiring timing Taq2 so as to prevent noise being superposed on the second current IH2.

In the case where the first acquiring p

Step S51 acquires the second current IH2 in accordance with the second acquiring period Taq2. According to the present embodiment, the second acquiring period Taq2 is determined in accordance with a period where superposition of noise is settled, which is different from the first acquiring period Taq1 of the first current IH1.

At step S52, the process calculates a difference between the first and second acquiring period ΔTaq. Specifically, the difference ΔTaq of the acquiring periods is calculated by using the following equation (10).

$$\Delta Taq = Taq1 - \Delta Taq2 \tag{10}$$

Step S52 corresponds to difference calculation unit.

At step S53, the process calculates an inclination of the second current IH2. According to the present embodiment, the process calculates a ripple current flowing through the reactor 41 to be the inclination of the second current. A change in the ripple current is calculated by the following equation (11) using voltage generated between both ends of the reactor 41 and inductance of the reactor 41.

$$\Delta I/\Delta t = (VBr - VHr/N)/Li \tag{11}$$

At step S54, the process calculates a predicted value of the second current IH2 at the first acquiring period Taq1 based on the difference ΔTaq of the acquiring periods calculated at step S52 and the inclination (ΔI/Δt) calculated at step S53. According to the present embodiment, the process calculates a predicted value of the second current IH2 with the following equation (12).

$$IH2es = IH2 + (\Delta I/\Delta t) \times \Delta Taq \tag{12}$$

IH2es corresponds to the predicted value of the second current IH2. Step S54 corresponds to current calculation unit.

At step S13 shown in FIG. 5, the process predicts the magnetization bias current Ibc based on the first current IH1 and the predicted value IH2es of the second current calculated with reference to the first acquiring period Taq1.

According to the above-described configuration, the power conversion system 10 of the present embodiment can obtain the following effects and advantages.

The control unit 60 calculates a predicted value of the second current IH2 at the first acquiring period Taq1. Then, the process calculates the magnetization bias current Ibc based on the first current IH1 acquired at the acquiring period Taq1 which is set as the reference. Hence, even when the current fluctuates between the A mode and the C mode in a period where noise is superimposed on the current, offset error can be appropriately cancelled. Also, acquiring periods for acquiring the first and second current IH1 and IH2 can be flexibly set so that the system can be flexibly designed.

(Modification of Fourth Embodiment)

The process may calculate a predicted value of the first current IH1 at the second acquiring period Taq2. In this case, at step S54, the process may calculate a predicted value of the first current IH1 at the second acquiring period Taq2 based on the difference ΔTaq of the acquiring periods calculated at step S52 and the inclination (ΔI/Δt) of the first current IH1 calculated at step S53.

(Other Embodiment)

Figure 17:
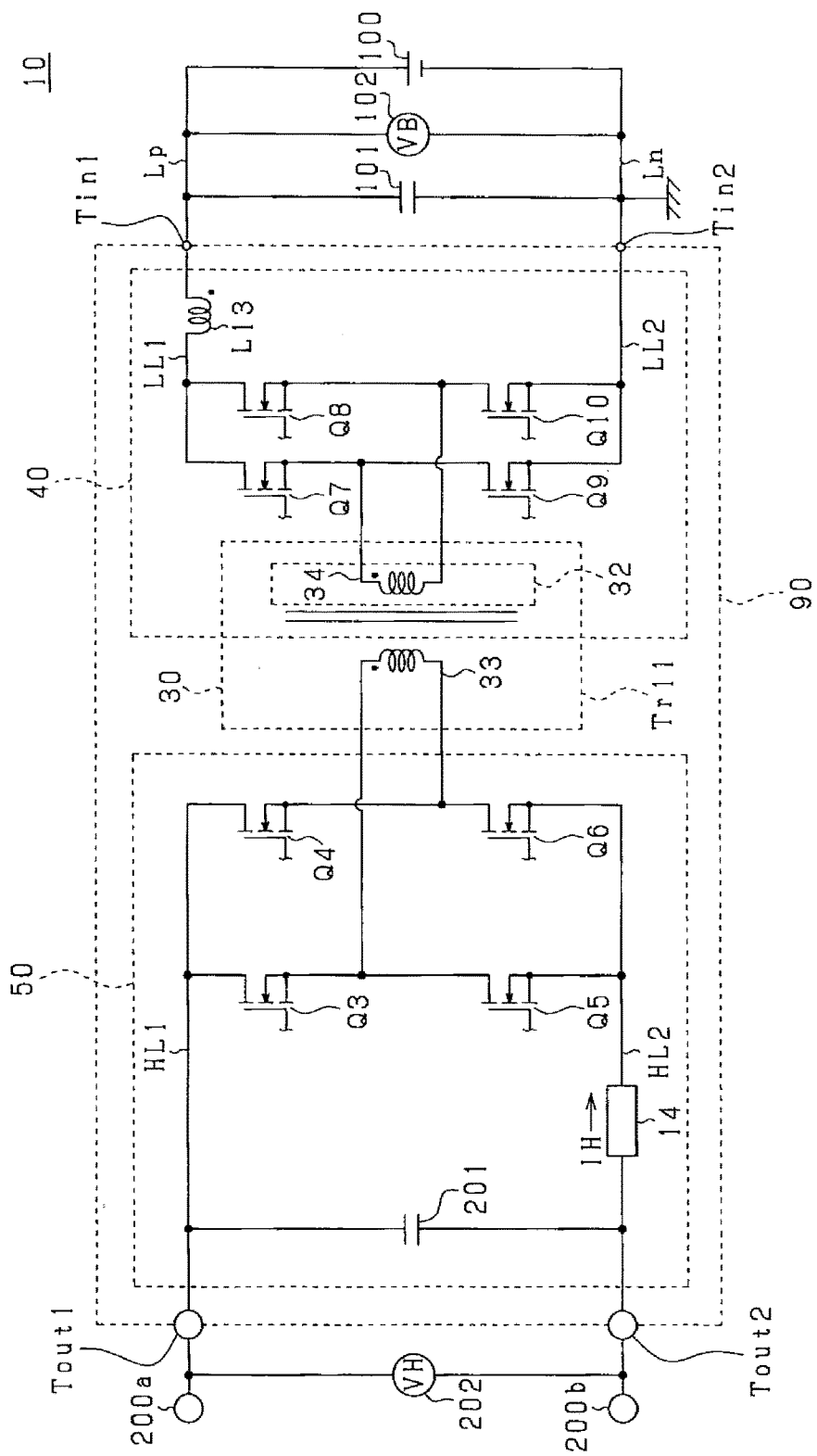
FIG. 17 is a block diagram showing a power conversion system according to a modification example.

The first circuit 40 can be configured of full-bridge type current mode circuit instead of using center tap current mode circuit. FIG. 17 is a block diagram showing a power conversion system 10 as a modification example. The first circuit 40 includes a third leg serially connected to the source of a seventh switch Q7 and the drain of a ninth switch Q9, and a fourth leg serially connected to the source of an eighth switch Q8 and the drain of a tenth switch Q10. The third leg and the fourth leg are connected in parallel between the first and second low voltage wirings LL1 and LL2. Also, the connection point between the seventh switch Q7 and the ninth switch Q9 is connected to the first end of the fourth coil 34, and the connection point between the eighth switch Q8 and the tenth switch Q10 is connected to the second end of the fourth coil 34.

Also, in the second circuit 50, the second current sensor 14 is connected to the second high voltage wiring HL2. The control unit 60 shortens the ON periods of the seventh and tenth switches Q7 and Q10, and increases the ON periods of the eighth and ninth switches Q8 and Q9, when the magnetization bias current Ibc is in negative side. Further, the control unit 60 increases the ON periods of the seventh and tenth switches Q7 and Q10, and shortens the ON periods of the eighth and ninth switches Q8 and Q9, when the magnetization bias current Ibc is positive.

The first current sensor 13 included in the first circuit 40 may detect the first and second current IH1 and IH2.

The second current sensor 14 may be configured to detect current that flows through the third to sixth switches Q3 to Q6, and may be serially connected to the third coil 33.

The second current 50 may be configured of an asynchronous-rectification voltage type converter instead of using a synchronous-rectification voltage type converter. In this case, the second circuit 50 is configured of a diode rectification circuit that rectifies AC voltage of the third coil 33 included in the transformer 30 by using a diode.

The third switch and the fourth switch may be configured of a half bridge circuit instead of being configured a full-bridge circuit.

In the above-described embodiment, the DDC 90 is configured of a boost type converter as an example. However, the DDC 90 may be configured of a buck converter.

What is claimed is:

1. A control unit adapted to a power conversion apparatus including:
   a transformer;
   an inverter circuit that controls a first input switch and a second input switch to be ON and OFF to convert a direct current into an alternating current, thereby allowing the alternating current to flow through a primary coil of the transformer;
   a rectifier circuit that converts an AC voltage of a secondary coil of the transformer into a DC voltage; and
   a current sensor that detects current flowing through the inverter circuit or the rectifier circuit, wherein
   the control unit comprises:
   a first acquiring unit that acquires a detection value of the current sensor as a first current during a period in which the first input switch turns ON and the second input switch turns OFF;
   a second acquiring unit that acquires a detection value of the current sensor as a second current during a period in which the second input switch turns ON and the first input switch turns OFF;
   a prediction unit that predicts, based on a difference between the first current and the second current, a specific amount of magnetization bias that indicates a deviation in an excitation current flowing through the transformer; and a reduction unit that performs a reduction process changing a drive mode of the inverter circuit or the rectifier circuit so as to reduce the magnetization bias of the transformer, wherein the reduction process is based on the specific amount of magnetization bias predicted by the prediction unit.

2. The control unit according to claim 1, wherein
the reduction unit performs an adjusting process as the reduction process based on the specific amount of magnetization bias predicted by the prediction unit, the adjusting process adjusting a duty cycle of at least one of the first input switch and the second input switch.

3. The control unit according to claim 2, wherein
the control unit includes an average current mode control unit performing an average current mode control that sets the duty cycles of the first input switch and the second input switch so as to control a current flowing through the inverter circuit or the rectifier circuit to be a predetermined value; and
the reduction unit is configured to adjust the duty cycles set by the average current mode control unit, based on the specific amount of magnetization bias predicted by the prediction unit.

4. The control unit according to claim 2, wherein
the control unit includes a peak current mode control unit performing a peak current mode control that sets turn-off times of the first input switch and the second input switch, based on a peak value of a current flowing through the inverter circuit; and
the reduction unit is configured to perform a delay-correction of the turn-off times set by the peak current mode control unit, based on the specific amount of magnetization bias predicted by the prediction unit, thereby adjusting the duty cycles.

5. The control unit according to claim 4, wherein
the reduction unit is configured to calculate an amount of delay-correction of the turn-off times based on the specific amount of magnetization bias predicted by the prediction unit, so as to apply delay-correction to the turn-off time of the first input switch or the turn-off time of the second input switch in accordance with a positive or negative sign of the calculated amount of delay-correction.

6. The control unit according to claim 1, wherein
one switching period of the first input switch and one switching period of the second input switch are set to be the same;
a start timing of a turn-on time of the first input switch and a start timing of a turn-on time of the second input switch are shifted from each other by a half period of the one switching period; and
an acquisition timing of the first current by the first acquiring unit and an acquisition timing of the second current by the second acquiring unit are shifted from each other by a half period of the one switching period.

7. The control unit according to claim 1, wherein
the first acquiring unit is configured to acquire a detection value of the current sensor as the first current at a timing where a first period has elapsed after the second input switch has turned OFF in a period where the first input switch is ON; and
the second acquiring unit is configured to acquire a detection value of the current sensor as the second current at a timing where a second period has elapsed after the first input switch has turned OFF in a period where the second input switch is ON.

8. The control unit according to claim 7, wherein
the control unit includes:
a ripple current calculation unit that calculates a ripple current of the detection value of the current sensor; and
a current calculation unit that, based on a difference between the first period and the second period, the ripple current calculated by the ripple current calculation unit, and the second current acquired by the second acquiring unit, calculates a prediction value of the second current at a timing in which the first period has elapsed after the second input switch has turned OFF,
the prediction unit is configured to predict the specific amount of magnetization bias based on the prediction value of the second current calculated by the current calculation unit, and the first current.

9. The control unit according to claim 7, wherein
the control unit includes:
a ripple current calculation unit that calculates a ripple current of the detection value of the current sensor; and
a current calculation unit that, based on a difference between the first period and the second period, the ripple current calculated by the ripple current calculation unit, and the first current acquired by the first acquiring unit, calculates a prediction value of the first current at a timing in which the second period has elapsed after the first input switch has turned OFF,
the prediction unit is configured to predict the specific amount of magnetization bias based on the prediction value of the first current calculated by the current calculation unit, and the second current.

10. The control unit according to claim 1, wherein the current sensor is configured to detect current flowing through the rectifier circuit.

11. The control unit according to claim 1, wherein the rectifier circuit includes a first synchronous rectifier and a second synchronous rectifier, and controls each of the first and second synchronous rectifiers to convert the AC voltage outputted from the secondary coil into the DC voltage; and
the reduction unit performs an adjusting process as the reduction process based on the specific amount of magnetization bias predicted by the prediction unit, the adjusting process adjusting a duty cycle of at least one of the first input switch and the second input switch.

* * * * *